(12) United States Patent
Ide et al.

(10) Patent No.: US 8,572,008 B2
(45) Date of Patent: Oct. 29, 2013

(54) LEARNING APPARATUS AND METHOD, PREDICTION APPARATUS AND METHOD, AND PROGRAM

(75) Inventors: Naoki Ide, Tokyo (JP); Masato Ito, Tokyo (JP); Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 12/954,264

(22) Filed: Nov. 24, 2010

(65) Prior Publication Data

US 2011/0137834 A1 Jun. 9, 2011

(30) Foreign Application Priority Data

Dec. 4, 2009 (JP) ............................. P2009-277000

(51) Int. Cl.
*G06N 5/00* (2006.01)
(52) U.S. Cl.
USPC ............................................. 706/12; 706/45
(58) Field of Classification Search
USPC ...................................................... 706/12, 45
See application file for complete search history.

(56) References Cited

FOREIGN PATENT DOCUMENTS

| JP | 2006-134080 | 5/2006 |
|---|---|---|
| JP | 2008-204040 | 9/2008 |

OTHER PUBLICATIONS

Li, Knowledge Discovery From Discoveries, Master's Thesis, 2009, pp. 1-85.*
Clarkson, B. P., "Life Patterns: Structure form Wearable Sensors," Doctor of Philosophy in Media Arts and Sciences, MIT, pp. 1-130, (2002).

* cited by examiner

*Primary Examiner* — Wilbert L Starks
(74) *Attorney, Agent, or Firm* — Sherr & Jiang, PLLC

(57) ABSTRACT

A learning apparatus includes: a location acquiring section for acquiring time series data on locations of a user; a time acquiring section for acquiring time series data on times; and learning section for learning an activity model indicating an activity state of the user as a probabilistic state transition model, using the respective acquired time series data on the locations and the times as an input.

12 Claims, 32 Drawing Sheets

LEARNING APPARATUS AND METHOD, PREDICTION APPARATUS AND METHOD, AND PROGRAM

BACKGROUND OF THE INVENTION

1. Field of the Invention

The present invention relates to a learning apparatus and a learning method, a prediction apparatus and a prediction method and a program, and more particularly, to a learning apparatus and a learning method, a prediction apparatus and a prediction method and a program which are capable of more accurately predicting a future path and an elapsed time after a current time.

2. Description of the Related Art

In recent years, research has been made into modeling, into learning, a state of a user using time series data obtained from a wearable sensor which is a sensor which the user can wear on the body and recognizing a current state of the user using the learning model (for example, Japanese Unexamined Patent Application Publication No. 2006-134080, Japanese Unexamined Patent Application Publication No. 2008-204040, and "Life Patterns: Structure From Wearable Sensors", Brian Patrick Clarkson, Doctor Thesis, MIT, 2002).

Further, the present applicant has proposed in advance a method of probabilistically predicting a plurality of possibilities of an activity state of a user in a desired future time in Japanese Patent Application No. 2009-180780. In the method of Japanese Patent Application No. 2009-180780, it is possible to learn the activity state of the user from time series data as a probabilistic state transition model, to recognize a current activity state using the learned probabilistic state transition model, and to probabilistically predict the activity state of the user "after a predetermined time". Also, as an example of the prediction of the activity state of the user "after the predetermined time", Japanese Patent Application No. 2009-180780 discloses an example which recognizes a current location of the user and predicts a destination (location) of the user after the predetermined time.

In addition, the present applicant proposes a method of predicting arrival probabilities, path and time for a plurality of destinations even if there is no designation of an elapsed time from a current time called "after the predetermined time" as Japanese Patent Application No. 2009-208064, which is further developed from Japanese Patent Application No. 2009-180780. In the method of Japanese Patent Application No. 2009-208064, it is possible to search a node corresponding to a node of the destination from among nodes forming a probability model to thereby automatically detect destination candidates.

SUMMARY OF THE INVENTION

In the method of Japanese Patent Application No. 2009-208064, for example, in a case where a movement path for going to and returning from a certain destination is learned as a probabilistic model, with regard to a common location which is passed even in any of the going and returning, the going and the returning are distinguished from each other and different nodes are allocated thereto.

However, there is a case where the going and the returning are distinguished and the different nodes are not allocated thereto, according to a setting condition such as an initial state or the number of nodes set in the probabilistic model, a sampling interval of time series data, or the like. Thus, for example, in a prediction process, there is a case where a path is predicted to return to a departure location from the common location in the middle of a returning path. In order to prevent the path from being predicted to return to the departure location from the common location in the middle of the returning path, it may be considered that a going path is excluded from a search path, for example. However, such a path exception is not desirable in view of an actual behavior.

Accordingly, it is desirable to provide a technique which is capable of more accurately predicting a future path and an elapsed time after a current time.

According to an embodiment of the present invention, there is provided a learning apparatus including: location acquiring means for acquiring time series data on locations of a user; time acquiring means for acquiring time series data on times; and learning means for learning an activity model indicating an activity state of the user as a probabilistic state transition model, using the respective acquired time series data on the locations and the times as an input.

According to an embodiment of the present invention, there is a learning method performed by a learning apparatus which recognizes an activity model indicating an activity state of a user and learns the activity model of the user for use in a prediction apparatus which predicts a behavior of the user as a probabilistic state transition model, the method including the steps of: acquiring time series data on locations of the user; acquiring time series data on times; and learning the activity model of the user as the probabilistic state transition model, using the respective acquired time series data on the locations and the times as an input.

According to an embodiment of the present invention, there is provided a program which functions as the following means in a computer, the means including: location acquiring means for acquiring time series data on locations of a user; time acquiring means for acquiring time series data on times; and learning means for learning an activity model indicating an activity state of the user as a probabilistic state transition model, using the respective acquired time series data on the locations and the times as an input.

According to such an embodiment of the present invention, the time series data on the locations of the user is acquired, the time series data on the times is acquired, and the activity model of the user is learned as the probabilistic state transition model using the respective acquired time series data on the locations and the times as the input.

According to another embodiment of the present invention, there is provided a prediction apparatus including: location acquiring means for acquiring time series data on locations of a user; time acquiring means for acquiring time series data on times; behavior recognizing means for recognizing a current location of the user using an activity model of the user, wherein the activity model indicates an activity state of the user and is obtained by being learned as a probabilistic state transition model, using the respective acquired time series data on the locations and the times as an input, by a learning apparatus; behavior predicting means for predicting a possible path and a selection probability of the path from the current location of the user recognized by the behavior recognizing means; and arrival time predicting means for predicting an arrival time and an arrival probability for arrival at a destination from the predicted path and selection probability.

According to another embodiment of the present invention, there is provided a prediction method performed by a prediction apparatus which performs prediction using an activity model of a user in which a learning apparatus learns the activity model indicating an activity state of the user as a probabilistic state transition model, the method including the steps of: acquiring time series data on locations of the user;

acquiring time series data on times; and recognizing a current location of the user using the activity model of the user learned using the respective acquired time series data on the locations and the times as an input, by the learning apparatus; predicting a possible path and a selection probability of the path from the recognized current location of the user; and predicting an arrival time and an arrival probability for arrival at a destination from the predicted path and selection probability.

According to another embodiment of the present invention, there is provided a program which functions as the following means in a computer, the means including: location acquiring means for acquiring time series data on locations of a user; time acquiring means for acquiring time series data on times; behavior recognizing means for recognizing a current location of the user using an activity model of the user, wherein the activity model indicates an activity state of the user and is obtained by being learned as a probabilistic state transition model, using the respective acquired time series data on the locations and the times as an input, by a learning apparatus; behavior predicting means for predicting a possible path and a selection probability of the path from the current location of the user recognized by the behavior recognizing means; and arrival time predicting means for predicting an arrival time and an arrival probability for arrival at a destination from the predicted path and selection probability.

According to such an embodiment of the present invention, the time series data on the locations of the user is acquired; the time series data on the times is acquired; the current location of the user is recognized using the activity model of the user obtained by being learned by the learning apparatus using the respective acquired time series data on the locations and the times as the input; the possible path and the selection probability of the path are predicted from the recognized current location of the user; and the arrival time and the arrival probability for arrival at the destination from the predicted path and selection probability.

The learning apparatus and the prediction apparatus may be provided as individual apparatuses, or may be provided as internal blocks constituting a single apparatus.

As described above, according to an embodiment of the present invention, it is possible to learn learning parameters used by a prediction apparatus which more accurately predicts a future path and an elapsed time after a current time.

Further, according to another embodiment of the present invention, it is possible to accurately predict a future path and an elapsed time after a current time.

BRIEF DESCRIPTION OF THE DRAWINGS

FIG. 34 is a block diagram illustrating a configuration example of a computer according to an exemplary embodiment of the present invention.

DESCRIPTION OF THE PREFERRED EMBODIMENTS

Hereinafter, exemplary embodiments for carrying out the present invention will be described. For comparison with the prior applications disclosed in the "BACKGROUND OF THE INVENTION", the method disclosed in Japanese Patent Application No. 2009-208064 will be briefly described, and then the embodiments of the present invention will be described. That is, the description will be made in the following order:

1. First embodiment of Japanese Patent Application No. 2009-208064 (an example in which a destination is designated, and a path and an arrival time up to the designated destination are predicted)

2. Second embodiment of Japanese Patent Application No. 2009-208064 (an example in which a destination is predicted, and also a path and an arrival time up to the destination are predicted)

3. First embodiment of the present invention (embodiment in which an HMM of a multi-stream input using time series data on times and locations is a learning model)

4. Second embodiment of the present invention (embodiment in which an HMM of a multi-stream input also using time series data on additional information is a learning model, in addition to the time series data on times and locations)

5. Third embodiment of the present invention (embodiment in which an HMM of a multi-stream input using time series data on times and locations is a learning model, and other information is additionally used.)

6. Fourth embodiment of the present invention (embodiment in which a behavior mode is further recognized in addition to the third embodiment of the present invention to further predict a destination)

7. Description about verification experimental results according to the embodiments of the present invention 1. First Embodiment of Japanese Patent Application No. 2009-208064

[Block Diagram Illustrating First Configuration of Japanese Patent Application No. 2009-208064]

Figure 1:
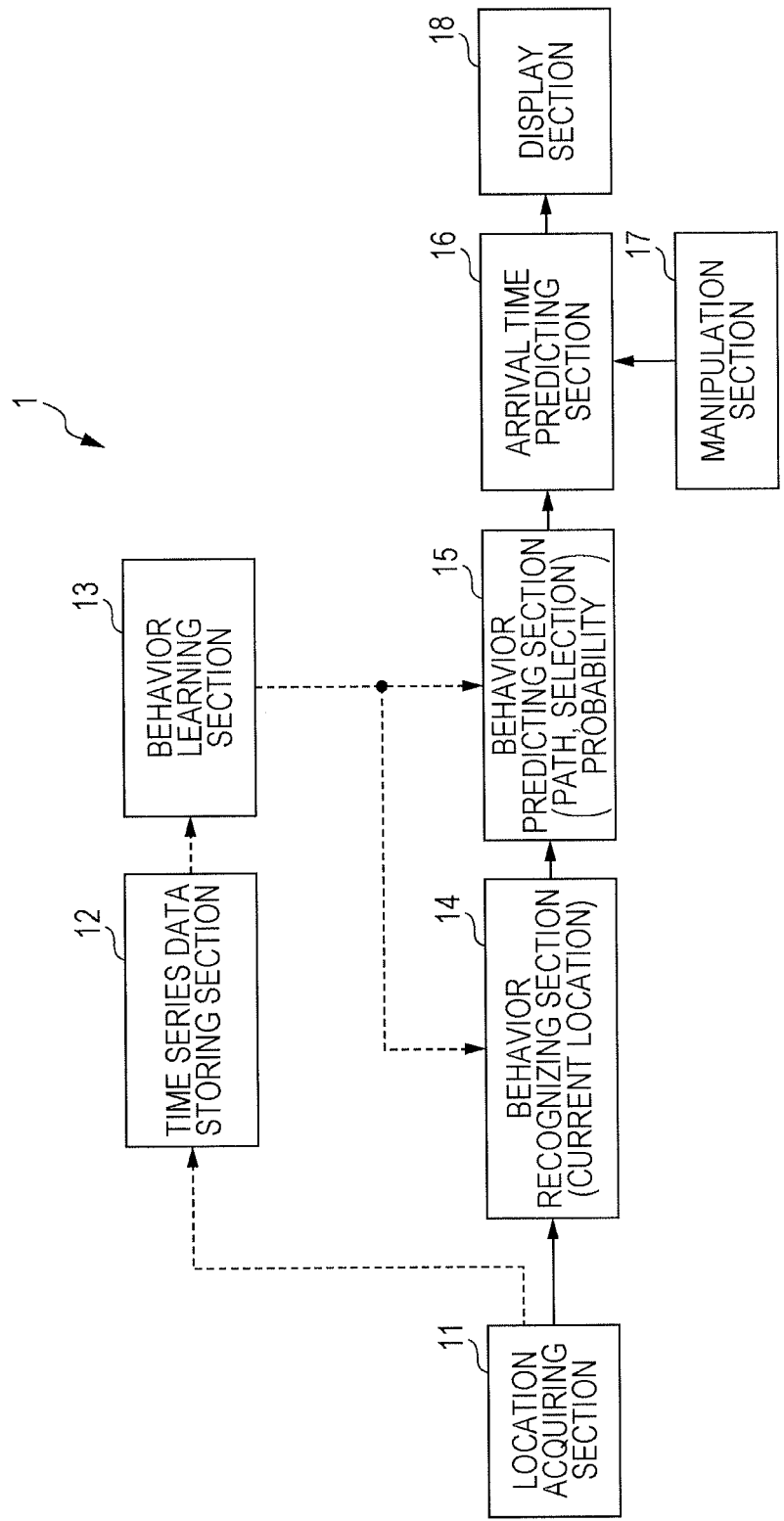
FIG. 1 is a block diagram illustrating a first configuration example of a prediction system according to Japanese Patent Application No. 2009-208064.

FIG. 1 is a block diagram illustrating a first configuration example of a prediction system proposed in Japanese Patent Application No. 2009-208064.

The prediction system 1 includes a location acquiring section 11, a time series data storing section 12, a behavior learning section 13, a behavior recognizing section 14, a behavior predicting section 15, an arrival time predicting section 16, a manipulation section 17 and a display section 18.

The prediction system 1 performs a learning process for learning an activity state (a state indicating a behavior and an activity pattern) of a user as a probabilistic state transition model, from time series data indicating a current location acquired by the location acquiring section 11. Further, the prediction system 1 performs a prediction process for predicting a path and a time up to a destination designated by the user, using the probabilistic state transition model (user activity model) indicated by parameters obtained by a learning process.

In FIG. 1, a dotted arrow represents a flow of data in the learning process and a solid arrow represents a flow of data in the prediction process.

The location acquiring section 11 is provided with, for example, a GPS sensor, and sequentially acquires data on the latitude and longitude indicating its location at predetermined time intervals (for example, 15 seconds). The location acquiring section 11 may not acquire the data on the location at the predetermined intervals. For example, the GPS sensor is not able to capture a satellite in a tunnel, underground or the like, and the acquisition interval may be long. In such a case, it is possible to interpolate data by performing an interpolation process or the like.

In the learning process, the location acquiring section 11 supplies the acquired location (latitude and longitude) data to the time series data storing section 12. Further, in the prediction process, the location acquiring section 11 supplies the acquired location data to the behavior recognizing section 14.

The time series data storing section 12 stores the location data continuously acquired by the location acquiring section 11, that is, the time series data on the locations. Since a behavior and an activity pattern of a user are learned, for example, time series data stored for a certain period such as several days is necessary.

The behavior learning section 13 learns an activity state of a user who carries a device provided with the location acquiring section 11 as the probabilistic state transition model, on the basis of the time series data stored in the time series data storing section 12. Since the time series data indicates the location of the user, the activity state of the user learned as the probabilistic state transition model represents a time series change in a current location of the user, that is, a movement path of the user. As the probabilistic state transition model used for learning, for example, a probabilistic state transition model including a hidden state, such as an ergodic HMM (Hidden Markov Model) can be employed. The prediction system 1 employs a probabilistic state transition model in which a sparse restriction is given to the ergodic HMM. A calculation method of the ergodic HMM having the sparse restriction and parameters of the ergodic HMM, or the like will be described later with reference to FIGS. 4 to 6.

The behavior learning section 13 supplies the parameters of the probabilistic state transition model obtained by the learning process to the behavior recognizing section 14 and the behavior predicting section 15.

The behavior recognizing section 14 recognizes a current behavior state of the user, that is, a current location of the user, from the time series data on the locations supplied in real time from the location acquiring section 11, using the probabilistic state transition model of the parameters obtained through learning. The behavior recognizing section 14 supplies a node number of a current state node of the user to the behavior predicting section 15.

The behavior predicting section 15 proportionately searches (predicts) paths which can be taken by the user from the current location of the user indicated by the node number of the state node supplied from the behavior recognizing section 14, using the probabilistic state transition model of the parameters obtained through learning. Further, the behavior predicting section 15 calculates an occurrence probability for each searched path to predict a selection probability which is a probability that the searched path is selected.

The path which can be taken by the user from the behavior predicting section 15 and the selection probability thereof are supplied to the arrival time predicting section 16. Further, information indicating a destination designated by the user through the manipulation section 17 is supplied to the arrival time predicting section 16.

The arrival time predicting section 16 extracts paths including the destination designated by the user from the paths which can be taken by the user as the search result, and predicts an arrival time up to the destination for each extracted path. Further, the arrival time predicting section 16 predicts an arrival probability which is the probability that the user reaches the destination. In a case where a plurality of paths exists for the destination, the arrival time predicting section 16 calculates the sum of the selection probabilities of the plurality of paths as the arrival probability for the destination. In a case where only one path exists for the destination, the selection probability of the path becomes the arrival probability for the destination. Thus, the arrival time predicting section 16 supplies information indicating the prediction result to the display section 18 for display.

The manipulation section 17 receives information about the destination input by the user and supplies the information to the arrival time predicting section 16. The display section 18 displays the information supplied from the arrival time predicting section 16.

[Hardware Configuration Example of Prediction System]

Figure 2:
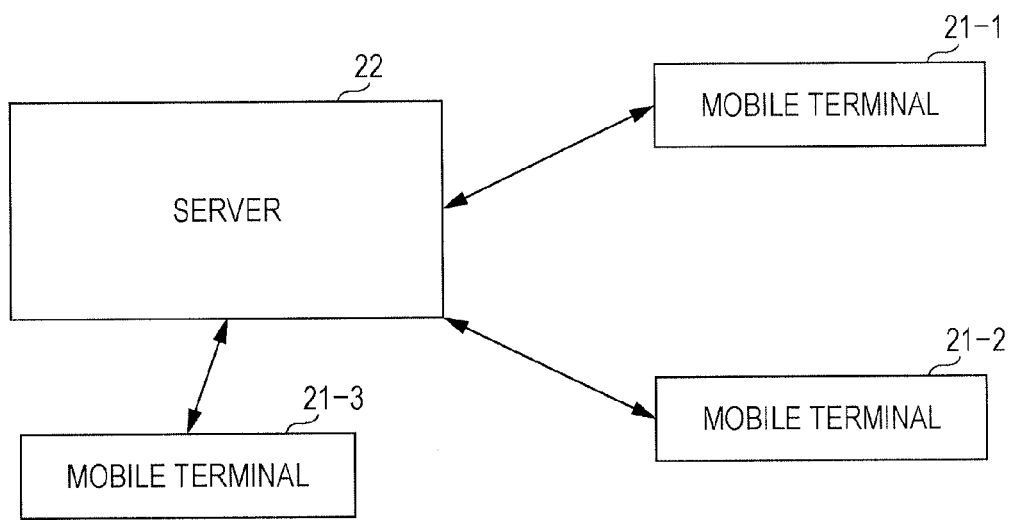
FIG. 2 is a block diagram illustrating a configuration example of hardware of a prediction system.

The prediction system 1 having such a configuration can employ a hardware configuration shown in FIG. 2, for example. That is, FIG. 2 is a block diagram illustrating the hardware configuration example of the prediction system 1.

In FIG. 2, the prediction system 1 includes three mobile terminals 21-1 to 21-3, and a server 22. The mobile terminals 21-1 to 21-3 are the same type mobile terminals 21 having the same function, but the mobile terminals 21-1 to 21-3 are possessed by different users. Only three mobile terminals 21-1 to 21-3 are shown in FIG. 2, but in reality, the number of the mobile terminals 21 may correspond to the number of users.

The mobile terminals 21 can perform transmission and reception of data to/from the server 22 by communication through a network such as a wireless communication network and the internet. The server 22 receives the data transmitted from the mobile terminals 21 and performs a predetermined process for the received data. Further, the server 22 transmits the process result of the data processing to the mobile terminals 21 by wireless communication or the like.

Accordingly, the mobile terminals 21 and the server 22 have a communication section which performs communication in a wireless or wired manner.

Further, each mobile terminal 21 may include the location acquiring section 11, the manipulation section 17 and the display section 18 shown in FIG. 1; and the server 22 may include the time series data storing section 12, the behavior learning section 13 and the behavior recognizing section 14, the behavior predicting section 15 and the arrival time predicting section 16 shown in FIG. 1.

With such a configuration, in the learning process, the mobile terminal 21 transmits the time series data acquired by the location acquiring section 11. The server 22 learns the activity state of the user by the probabilistic state transition model, on the basis of the received time series data for learning. Further, in the prediction process, the mobile terminal 21 transmits the destination designated by the user through the manipulation section 17, and transmits the location data acquired by the location acquiring section 11 in real time. The server 22 recognizes the current activity state of the user, that is, the current location of the user, using the parameters obtained through learning, and transmits the path and time up to the designated destination to the mobile terminal 21 as the process result. The mobile terminal 21 displays the process result transmitted from the server 22 on the display section 18.

Further, for example, the mobile terminal 21 may include the location acquiring section 11, the behavior recognizing section 14, the behavior predicting section 15, the arrival time predicting section 16, the manipulation section 17 and the display section 18 shown in FIG. 1; and the server 22 may include the time series data storing section 12 and the behavior learning section 13 shown in FIG. 1.

With such a configuration, the mobile terminal 21 transmits the time series data acquired by the location acquiring section 11 in the learning process. The server 22 learns the activity state of the user by the probabilistic state transition model on the basis of the received time series data for learning, and then transmits the parameters obtained through learning to the mobile terminal 21. Further, in the prediction process, the mobile terminal 21 recognizes the location data acquired in real time by the location acquiring section 11, that is, the current location of the user, using the parameters received from the server 22, and then calculates the path and time up to the designated destination. Further, the mobile terminal 21 displays the path and time up to the destination as the calculation result on the display section 18.

Division of roles between the mobile terminal 21 and the server 22 as described above can be determined according to a process capability of each data processing apparatus or a communication environment.

In the learning process, the time necessary for one process is very long, but it is not necessary to frequently perform the process. Accordingly, since the server 22 generally has a higher process capability than the portable mobile terminal 21, it is possible to allow the server 22 to perform the learning process (parameter updating) on the basis of the time series data stored once a day.

On the other hand, it is preferable that the prediction process is rapidly performed in correspondence with the location data updated in real time every moment for display, and thus it is preferable that the process is performed in the mobile terminal 21. If the communication environment is rich, it is preferable that the prediction process is performed in the server 22 as described above and only the prediction result is received from the server 22, to thereby reduce the burden of the mobile terminal 21 which is preferably a portable minimum size.

Further, in a case where the mobile terminal 21 can independently perform the learning process and the prediction process as the data processing apparatus at a high speed, the mobile terminal 21 can be provided with the entire configuration of the prediction system 1 in FIG. 1.

[Example of Input Time Series Data]

Figure 3:
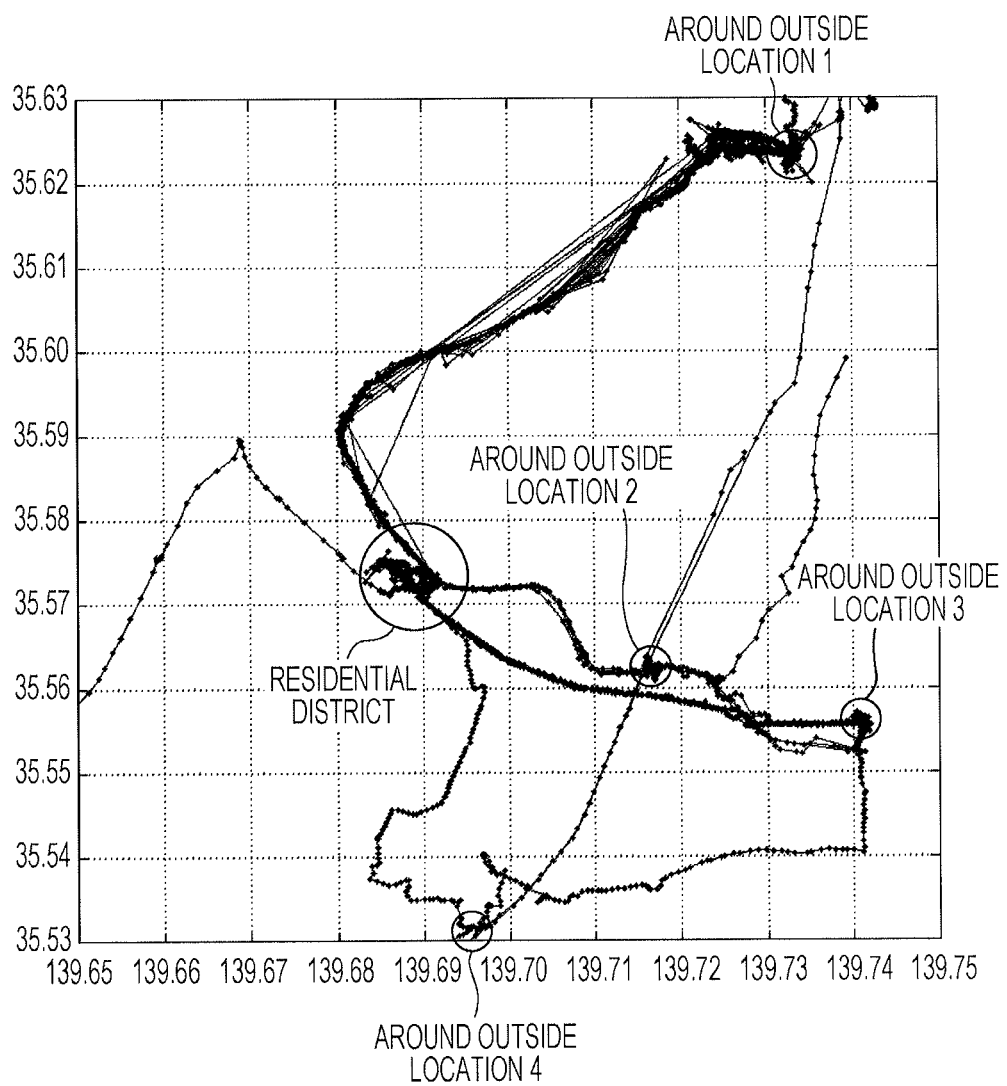
FIG. 3 is a diagram illustrating an example of time series data input to a prediction system.

FIG. 3 is a diagram illustrating an example of the time series data on the locations acquired in the prediction system 1. In FIG. 3, the horizontal axis represents the longitude, and the vertical axis represents the latitude.

The time series data shown in FIG. 3 is time series data stored in a period of about one and a half months by an experimenter. As shown in FIG. 3, the time series data includes data on a residential district and four outside movement locations such as a work location. The time series data also includes data in which the location data is in the sky without capturing the satellite.

The time series data shown in FIG. 3 is a data example different from data used for a verification experiment to be described later.

[Ergodic HMM]

Next, the ergodic HMM employed by the prediction system 1 as the learning model will be described.

Figure 4:
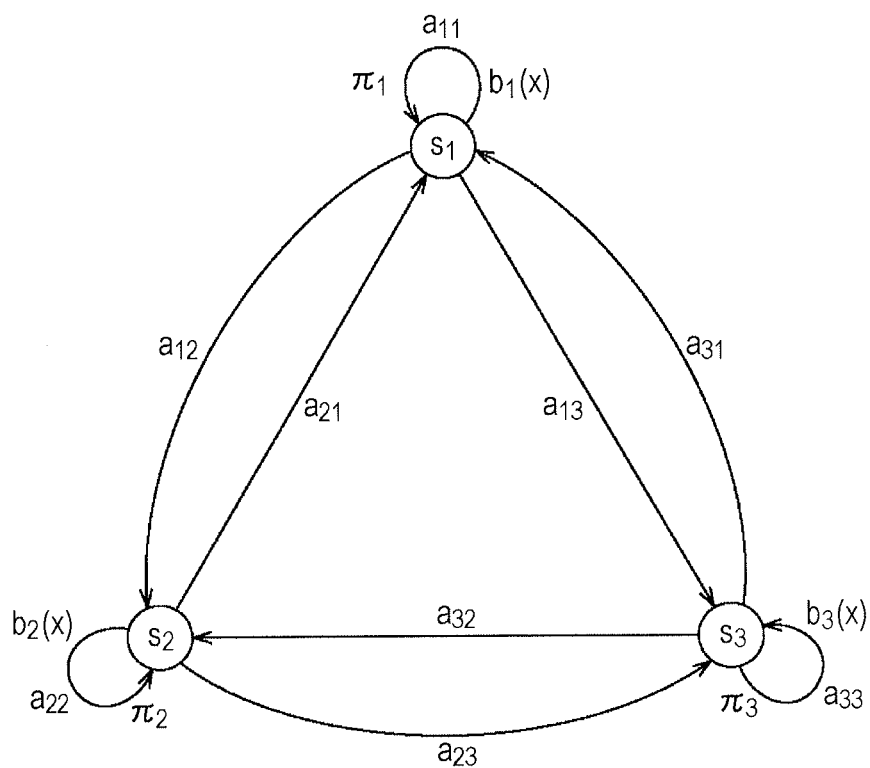
FIG. 4 is a diagram illustrating an example of an HMM.

FIG. 4 is a diagram illustrating an example of an HMM.

The HMM is a state transition model having states and inter-state transitions.

FIG. 4 is a diagram illustrating an example of a three-state HMM.

In FIG. 4 (the same with the subsequent figures), a circle represents a state, and an arrow represents a state transition. The state corresponds to the activity state of the user, and is referred to as a state node, simply a node.

Further, in FIG. 4, $s_i$ (i=1, 2 and 3 in FIG. 4) represents a state (node), $a_{ij}$ represents a state transition probability to a state $s_j$ from the state $s_i$. Further, $b_j(x)$ represents an output probability density function in which an observation value x is observed in the state transition to the state $s_j$, and $\pi_i$ represents an initial probability in which the state $s_i$ is an initial state.

As the output probability density function $b_j(x)$, for example, a normal probability distribution is used.

Here, the HMM (continuous HMM) is defined by the state transition probability $a_{ij}$, the output probability density function $b_j(x)$ and the initial probability $\pi_i$. The state transition probability $a_{ij}$, the output probability density function $b_j(x)$ and the initial probability $\pi_i$ are referred to as HMM parameters $\lambda=\{a_{ij}, b_j(x), \pi_i,$ where i=1, 2, ... M, j=1, 2, ... M$\}$. M represents the number of HMM states.

As a method for estimating the HMM parameters $\lambda$, the Baum-Welch likelihood estimation method is widely used. The Baum-Welch likelihood estimation method is a parameter estimation method based on the EM algorithm (Expectation-Maximization algorithm).

According to the Baum-Welch likelihood estimation method, the HMM parameters $\lambda$ are estimated so that a likelihood calculated from an occurrence probability which is a probability that the time series data is observed (occurs) is maximized, on the basis of the observed time series data $x=x_1, x_2, ... x_T$. Here, $x_t$ represents a signal (sample value) observed at a time t, and T is represents the length (sample number) of the time series data.

The Baum-Welch likelihood estimation method is, for example, disclosed in "Pattern Recognition and Machine Learning (II)", C. M. Bishop, P 333 (English original: "Pattern Recognition and Machine Learning (Information Science and Statistics)", Christopher M. BishopSpringer, New York, 2006) hereinafter, referred to as "document A").

The Baum-Welch likelihood estimation method is a parameter estimating method based on likelihood maximization, but does not ensure optimality, and may converge to a local solution (local minimum) according to a structure of the HMM or initial values of the parameters $\lambda$.

The HMM is generally used in sound recognition. In the HMM used in the sound recognition, the number of states, types of state transitions and the like are generally determined in advance.

Figure 5:
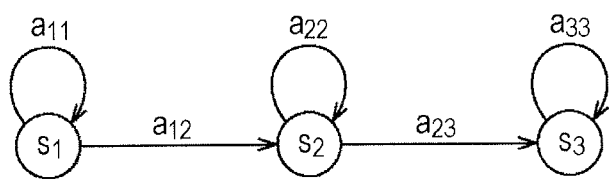
FIG. 5 is a diagram illustrating an example of an HMM used for sound recognition.

FIG. 5 is a diagram illustrating an example of the HMM used in the sound recognition.

The HMM in FIG. 5 is called a left-to-right type.

In FIG. 5, the number of the states becomes 3, and the state transition is restricted to a structure in which only a self transition (state transition to a state $s_i$ from a state $s_i$) and a state transition to a right neighboring state from the left are allowed.

Compared with the HMM with the restriction to the state transition as shown in FIG. 5, the HMM without the restriction to the state transition as shown in FIG. 4, that is, the HMM in which the state transition is possible from an arbitrary state $s_i$ to an arbitrary state $s_j$ is referred to as an "ergodic HMM".

The ergodic HMM is an HMM having the highest degree of freedom as a structure, but if the number of states is increased, it is difficult to estimate the parameters $\lambda$.

For example, if the number of states in the ergodic HMM is 1000, the number of the state transitions becomes 1,000,000 (=1000×1000).

Accordingly, in this case, for example, it is necessary to estimate 1,000,000 items of state transition probabilities $a_{ij}$, with respect to the state transition probability $a_{ij}$ in the parameters $\lambda$.

Thus, it is possible to apply a restriction (sparse restriction) called a sparse structure to the state transition set for the state, for example.

Here, the sparse structure is a structure in which states capable of being state-transited from a certain state are limited, which is not a tight state transition such as an ergodic HMM in which the state transition is possible from an arbitrary state to another arbitrary state. In this respect, it is assumed that at least one state transition to other states exists even in the sparse structure, and a self transition exists.

FIG. 6 illustrates the HMM to which a sparse restriction is applied.

In FIG. 6, a bi-directional arrow which connects two states represents a state transition from one direction of the two states to the other direction thereof, and a state transition from the other direction thereof to the one direction thereof. Further, in FIG. 6, a self transition can be performed in each state, and an arrow indicating the self transition is not shown in the figure.

In FIG. 6, 16 states are arranged in a two-dimensional space in a lattice shape. That is, in FIG. 6, 4 states are arranged in the transverse direction and 4 states are also arranged in the longitudinal direction.

Figure 6A:
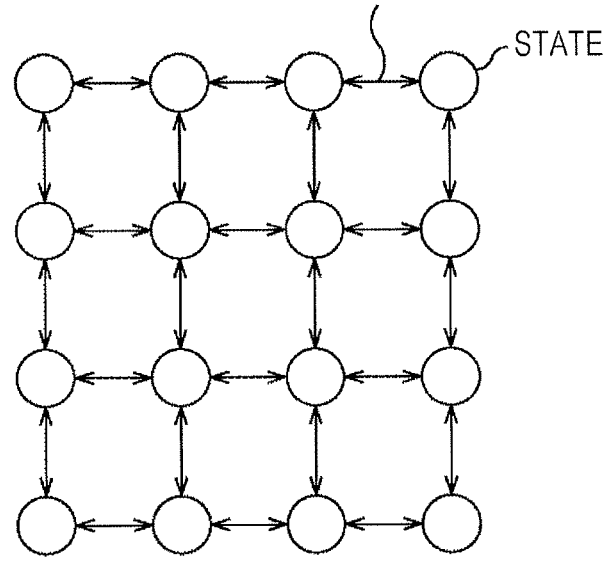
FIGS. 6A and 6B are diagrams illustrating an example of an HMM which is given a sparse restriction.

If it is assumed that the distance between the states adjacent to each other in the transverse direction, and the distance between the states adjacent to each other in the longitudinal direction are all 1, FIG. 6A illustrates the HMM to which a sparse restriction is applied, in which a state transition to a state in which the distance is equal to 1 or smaller is allowed, and a state transition to other states is not allowed.

Figure 6B:
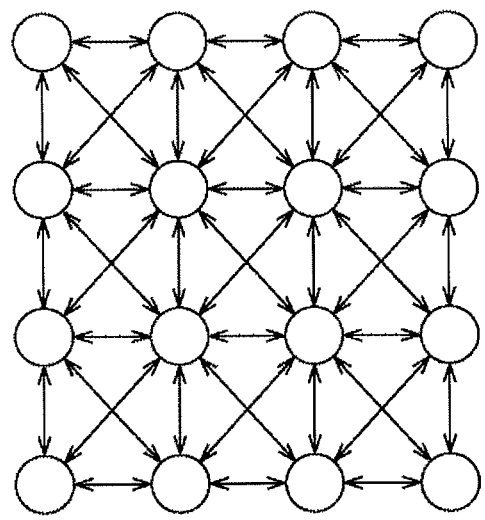

Further, FIG. 6B illustrates the HMM to which a sparse restriction is applied, in which a state transition to a state in which the distance is equal to $\sqrt{2}$ or smaller is allowed, and a state transition to other states is not allowed.

In the prediction system 1, the location data acquired by the location acquiring section 11 is supplied to the time series data storing section 12, as time series data $x=x_1, x_2, ... x_T$. The behavior learning section 13 estimates the HMM parameters $\lambda$ indicating the user activity model, using the time series data $x=x_1, x_2, ... x_T$ stored in the time series data storing section 12.

That is, the location (latitude and longitude) data on each time indicating a movement trace of the user is considered as observation data on probability variables which are normally distributed using spreading of a predetermined dispersion value from one point on a map corresponding to any one of the HMM states $s_j$. The behavior learning section 13 optimizes each point on the map corresponding to each state $s_j$, the dispersion value thereof, and the state transition probability $a_{ij}$.

The initial probability $\pi_i$ of the state $s_i$ can be set to a constant value. For example, the initial probability $\pi_i$ of each of M states $s_i$ is set to 1/M. Further, location data after performing a predetermined process such as an interpolation process for the location data acquired by the location acquiring section 11 may be supplied to the time series data storing section 12, as the time series data $x=x_1, x_2, ... x_T$.

The behavior recognizing section 14 applies a Viterbi rule to the user activity model (HMM) obtained through learning, and calculates a course (state series) (path) (hereinafter, referred to as a likelihood path) of a state transition in which a likelihood in which the location data $x = x_1, x_2, \ldots x_T$ is observed from the location acquiring section 11 becomes the maximum. Thus, a current activity state of the user, that is, the state $s_i$ corresponding to the current location of the user is recognized.

Here, the Viterbi rule is an algorithm for determining a path (likelihood path), among the paths of the state transitions using each state $s_i$ as a starting point, in which a value (occurrence probability) obtained by accumulating, the state transition probability $a_{ij}$ in which the state $s_i$ is transited to the state $s_j$ at the time t and a probability (output probability obtained from the output probability density function $b_j(x)$ in which a sample value $x_t$ at the time t in the location data $x = x_1, x_2, \ldots x_T$ in the state transition is observed, over the length T of the time series data x after processing, becomes the maximum. Details of the Viterbi rule are disclosed in the above-described document A, P. 347.

[Search Process of Path Through Behavior Predicting Section 15]

Next, a search process of the path by means of the behavior predicting section 15 will be described.

Each state $s_i$ of the HMM obtained through learning represents a predetermined point (location) on the map, and may represent a path from the state $s_i$ to the state $s_j$ when the state $s_i$ and the state $s_j$ are connected to each other.

In this case, each point corresponding to the state $s_i$ can be classified as any one of an end point, a pass point, a branch point and a loop. The end point is a point in which a probability other than the self transition is very small (probability other than the self transition is equal to a predetermined value or lower), in which a further movable point does not exist. The pass point is a point in which there exists one significant transition other than the self transition, in other words, there exists one further movable point. The branch point is a point in which there exist two or more significant transitions other than the self transition, that is, there exist two or more further movable points. The loop is a point which coincides with any one on the paths which have been passed thus far.

In a case where the path for the destination is searched, if there are different paths, it is preferable to present information on a necessary time or the like for the respective paths. Thus, in order to search available paths proportionately, the next conditions are set.

(1) Even though a path is branched once and joined again, it is considered as a different path.

(2) In a case where the end point in the path or a point included in the path which is passed thus far appears, the search of the path is terminated.

The behavior predicting section 15 uses a current activity state of the user which is recognized by the behavior recognizing section 14, that is, the current point of the user as a departure location, and classifies a state transition available point which is the next movement location as one of the end point, pass point, branch point, and loop, which will be repeated up to the termination condition (2).

In a case where the current point is classified as the end point, the behavior predicting section 15 connects the current point to the path thus far and then terminates the search of the path.

On the other hand, in a case where the current point is classified as the pass point, the behavior predicting section 15 connects the current point to the path thus far and then moves it to the next point.

Further, in a case where the current point is classified as the branch point, the behavior predicting section 15 connects the current point to the path thus far, copies the path thus far by the number of the branches, and then connects it to the branch point. Further, the behavior predicting section 15 moves one of the branch points to become the next point.

In a case where the current point is classified as the loop, the behavior predicting section 15 terminates the search of the path without connecting the current point to the path thus far. Since a case of turning back the path from the current point to a point directly before is included in the loop, this is not considered.

[Example of Search Process]

Figure 7:
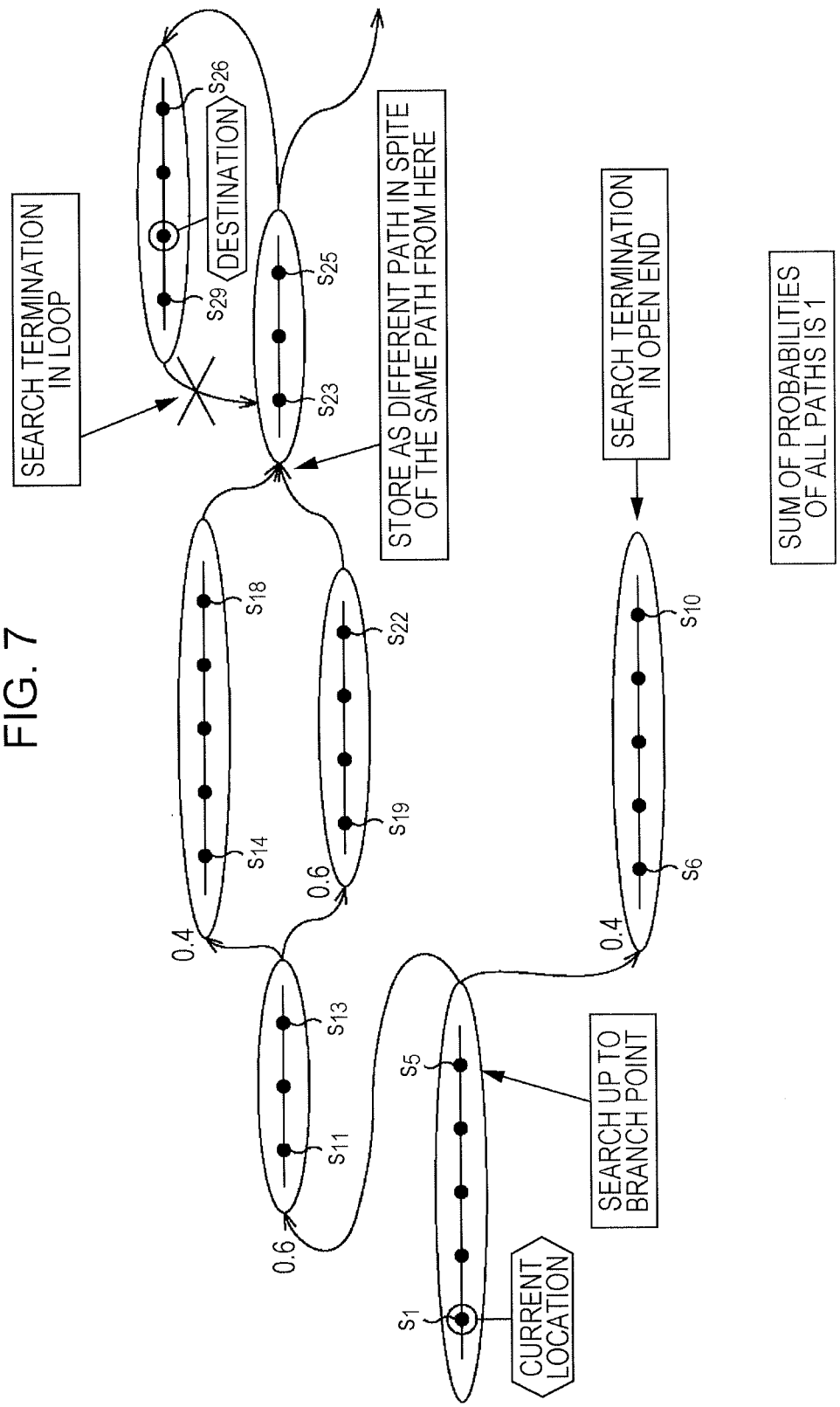
FIG. 7 is a diagram illustrating a simple example of a search process of a path by means of a behavior predicting section.

FIG. 7 is a diagram illustrating a simple example of a search process of the path by means of the behavior predicting section 15.

In the example shown in FIG. 7, in a case where a state $S_1$ is the current location, three paths are finally searched. The first path is a path leading to a state $s_{10}$ from the state $s_1$ through a state $s_5$, a state $s_6$ and the like (hereinafter, referred to as path A). The second path is a path leading to a state $s_{29}$ from the state $s_1$ through a state $s_5$, a state $s_{11}$, a state $s_{14}$, a state $s_{23}$ and the like (hereinafter, referred to as path B). The third path is a path leading to the state $s_{29}$ from the state $s_1$ through the state $s_5$, the state $s_{11}$, a state $s_{19}$, the state $s_{29}$ and the like (hereinafter, referred to as path C).

The behavior predicting section 15 calculates a probability (path selection probability) that each searched path is selected. The path selection probability is obtained by sequentially multiplying the transition probability between states for forming the path. Here, since it is necessary to consider only the case of being transited to the next state but not necessary to consider the case of being stationary in the location, the path selection probability is calculated using a transition probability $[a_{ij}]$ regulated by removing the self transition probability from the state transition probability $a_{ij}$ of each state obtained through learning.

The transition probability $[a_{ij}]$ regulated by removing the self transition probability can be expressed as the following equation (1).

$$[a_{ij}] = \frac{(1 - \delta_{ij})a_{ij}}{\sum_{j=1}^{N}(1 - \delta_{ij})a_{ij}} \quad (1)$$

Here, δ represents a Kronecker function, which becomes 1 only when suffixes i and j coincide with each other, and becomes 0 in cases other than this.

Accordingly, for example, in the state transition probability $a_{ij}$ of the state $s_5$ in FIG. 7, in a case where a self transition probability $a_{5,5}$ is 0.5, a transition probability $a_{5,6}$ is 0.2, and a transition probability $a_{5,11}$ is 0.3, a transition probability $[a_{5,6}]$ and a transition probability $[a_{5,11}]$ in a case where the state $a_5$ is branched to the state $s_6$ or the state $s_{11}$ are 0.4 and 0.6, respectively.

When a node number i of the state $s_i$ of the searched path is $(y_1, y_2, \ldots y_n)$ a selection probability $P(y_1, y_2, \ldots y_n)$ of the path can be expressed as the following equation (2), using the regulated transition probability $[a_{ij}]$.

$$P(y_1, y_2, \ldots, y_n) = [a_{y_1 y_2}][a_{y_2 y_3}] \ldots [a_{y_{n-1} y_n}] \quad (2)$$

$$= \prod_{i=1}^{n-1}[a_{y_{i-1} y_i}]$$

Actually, since the regulated transition probability [$a_{ij}$] in the pass point is 1, the regulated transition probability [$a_{ij}$] at the time of branching may be sequentially multiplied.

In the example shown in FIG. 7, a selection probability of the path A is 0.4. Further, a selection probability of the path B is 0.24=0.6×0.4. A selection probability of the path C is 0.36=0.6×0.6. Further, it can be found that the total sum of the calculated selection probabilities of the paths is 1=0.4+0.24+0.36 and the search can be proportionately performed.

As described above, each path searched on the basis of the current location and the selection probability thereof are supplied from the behavior predicting section 15 to the arrival time predicting section 16.

The arrival time predicting section 16 extracts a path including a destination which is designated by a user from the path which is searched by the behavior predicting section 15, and also predicts the time up to the destination for each extracted path.

For example, in the example shown in FIG. 7, paths including the state $s_{28}$ which is the destination, among the three searched paths A to C, are the paths B and C. The arrival time predicting section 16 predicts the time taken to reach the state $s_{28}$ which is the destination, via the path B or C.

In a case where there are many paths including the destination and thus it is difficult to see all paths displayed, or in a case where a presented number of the paths is set to a predetermined number, it is necessary to determine a path (hereinafter, approximately referred to as a display path) to be displayed on the display section 18, from all the paths including the destination. In such a case, since the selection probability for each path is calculated in the behavior predicting section 15, the arrival time predicting section 16 can determine the paths of the predetermined number as the display paths in descending order of the selection probability.

It is assumed that the current location of the current time $t_1$ is a state $s_{y1}$, paths determined at a time $(t_1, t_2, \ldots t_g)$ is $(s_{y1}, s_{y2}, \ldots s_{yg})$. In other words, it is assumed that the node number i of the determined state $s_i$ is $(y_1, y_2, \ldots y_g)$. Hereinafter, for simplicity of the description, the state $s_i$ corresponding to the location may be simply indicated as the node number i.

Since the current location $y_1$ at the current time $t_1$ is specified by recognition of the behavior recognizing section 14, a probability $P_{y1}(t_1)$ that the current location at the current time $t_1$ is $y_1$ is 1. Further, a probability that the current location is in a state other than $y_1$ at the current time $t_1$ is 0.

On the other hand, a probability $P_{yn}(t_n)$ that the current location is in the node number $y_n$ at a predetermined time $t_n$ can be expressed as the following equation (3).

$$P_{y_n}(t_n) = P_{y_n}(t_n-1)a_{y_n y_n} + P_{y_{n-1}}(t_n-1)a_{y_{n-1} y_n} \qquad (3)$$

Here, a first term on the right side of the equation (3) represents a probability that the current location is disposed in the original location $y_n$ and the self transition is performed; and a second item on the right side a probability that the transition is performed to the location $y_n$ from a location $y_{n-1}$ which is disposed directly before. In the equation (3), differently from the calculation of the path selection probability, the state transition probability $a_{ij}$ obtained through learning is used as it is.

A prediction value $<t_g>$ of the time $t_g$ at the time of reaching the destination $y_g$ can be expressed as the following equation (4), using a "probability that the current location is disposed in a location $y_{g-1}$ directly before the destination $y_g$ at a time $t_{g-1}$ directly before the time $t_g$ and moves to the destination $y_g$ at the time $t_g$".

$$\langle t_g \rangle = \sum_t t_g \left( \frac{P_{X_{g-1}}(t_{g-1} - 1)a_{X_{g-1} X_g}}{\sum_t P_{X_{g-1}}(t_g - 1)a_{X_{g-1} X_g}} \right) \qquad (4)$$

That is, the prediction value $<t_g>$ is expressed as an expectation value of the time until "the current location is disposed in a state $s_{yg-1}$ directly before a state $s_{yg}$ at the time $t_{g-1}$ directly before the time $t_g$ and moves to the state $s_{yg}$ at the time $t_g$".

[User Activity Model Learning Process]

Next, a user activity model learning process of learning a movement path of the user as a probabilistic state transition model indicating an activity state of the user, will be described with a reference to a flowchart in FIG. 8.

Firstly, in step S1, the location acquiring section 11 acquires location data and then supplies it to the time series data storing section 12.

In step S2, the time series data storing section 12 stores the location data which is continuously acquired by the location acquiring section 11, that is, the time series data on the locations.

In step S3, the behavior learning section 13 learns the user activity model as the probabilistic state transition model, on the basis of the time series data stored in the time series data storing section 12. That is, the behavior learning section 13 calculates the parameters λ of the probabilistic state transition model (user activity model), on the basis of the time series data stored in the time series data storing section 12.

In step S4, the behavior learning section 13 supplies the parameters λ of the probabilistic state transition model calculated in step S3 to the behavior recognizing section 14 and the behavior predicting section 15, and then terminates the process.

[Arrival Time Prediction Process]

Next, an arrival time prediction process of searching the path up to the destination using the parameters λ of the probabilistic state transition model indicating the user activity model obtained by the user activity model learning process in FIG. 8, and calculating the arrival time to present it to the user will be described.

Figure 9:
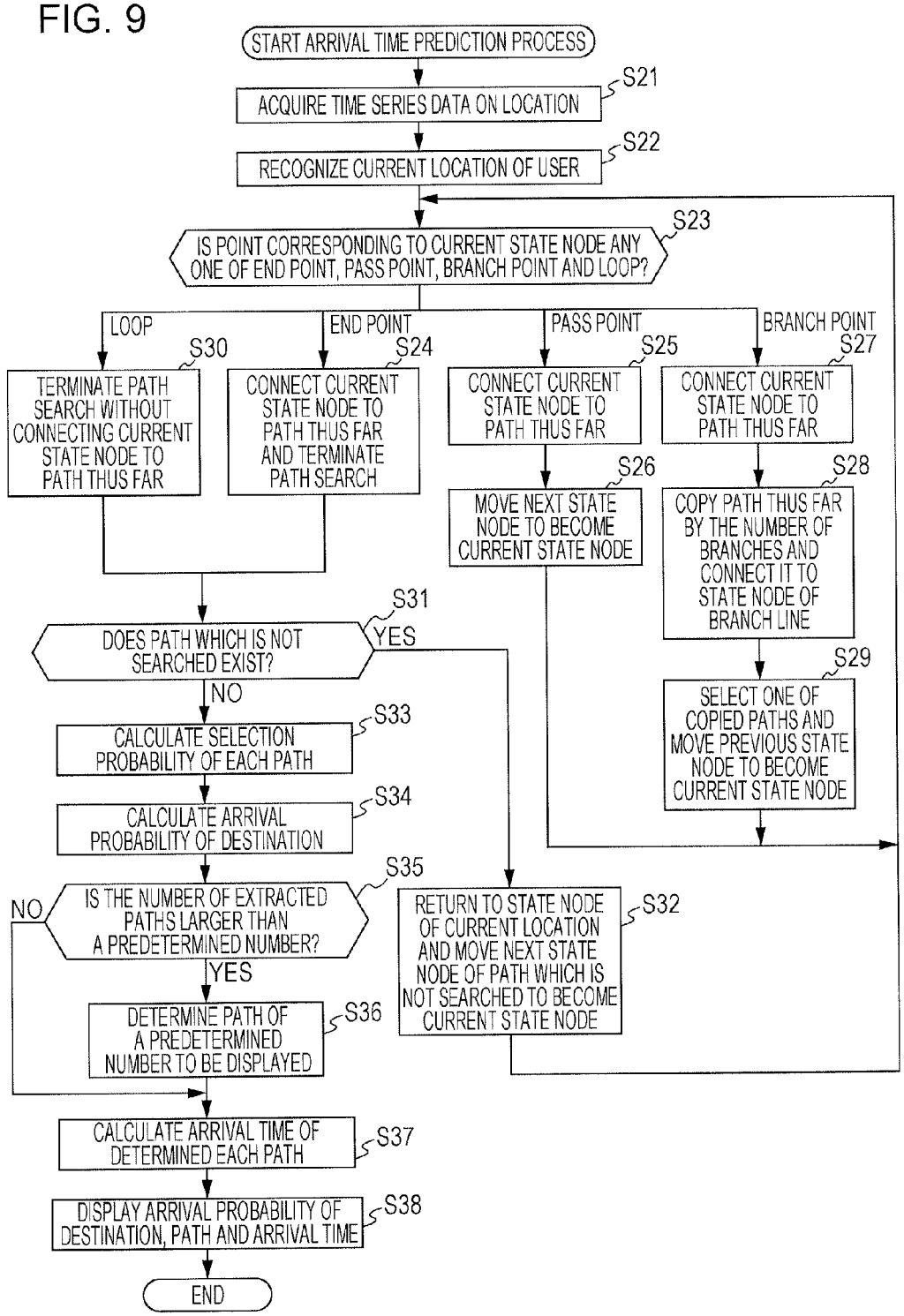
FIG. 9 is a flowchart illustrating an arrival time prediction process.

FIG. 9 is a flowchart illustrating the arrival time prediction process. In this example, before the process in FIG. 9, it is assumed that the destination is determined in advance. However, the destination may be input in the middle of the process in FIG. 9.

Firstly, in step S21, the location acquiring section 11 acquires the time series data on the locations and then supplies it to the behavior recognizing section 14. The time series data on the locations having a predetermined number of samples is temporarily stored in the behavior recognizing section 14.

In step S22, the behavior recognizing section 14 recognizes the current activity state of the user from the user activity model based on the parameters λ obtained through learning. That is, the behavior recognizing section 14 recognizes the current location of the user. Further, the behavior recognizing section 14 supplies the node number of the current state node of the user to the behavior predicting section 15.

In step S23, the behavior predicting section 15 determines whether a point corresponding to the state node which is being currently searched (hereinafter, referred to as a current state node) is any one of an end point, a pass point, a branch point and a loop. Right after the process in step S22, the state node corresponding to the current location of the user becomes the current state node.

In step S23, if it is determined that the point corresponding to the current state node is the end point, the procedure goes to step S24. Then, the behavior predicting section 15 connects the current state node to a path thus far and terminates the search of the path, and then the procedure goes to step S31. If the current state node is a state node corresponding to the current location, since there is no path thus far, the connection process is not performed. This is the case with steps S25, S27 and S30.

In step S23, if it is determined that the point corresponding to the current state node is the pass point, the procedure goes to step S25. Then, the behavior predicting section 15 connects the current state node to the path thus far. Then, in step S26, the behavior prediction section 15 moves the next state node to become the current state node. After the process of step S26, the procedure returns to step S23.

In step S23, if it is determined that the point corresponding to the current state node is the branch point, the procedure goes to step S27. Then, the behavior predicting section 15 connects the current state node to the path thus far. Then, in step S28, the behavior prediction section 15 copies the path thus far by the number of branches, and then connects them to the state nodes of the branch lines. Further, in step S29, the behavior predicting section 15 selects one of the copied paths, and moves the state node before the selected path to become the current state node. After the process of step S29, the procedure returns to step S23.

On the other hand, in step S23, if it is determined that the point corresponding to the current state node is the loop, the procedure goes to step S30. Then, the behavior predicting section 15 terminates the search of the path without connecting the current state node to the path thus far, and then the procedure goes to step S31.

In step S31, the behavior predicting section 15 determines whether a path which is not searched exists. In step S31, if it is determined that the unsearched path exists, the procedure goes to step S32. Then, the behavior predicting section 15 allows the procedure to return to the state node of the current location, and moves the next state node of the unsearched path to become the current state node. After the process of step S32, the procedure returns to step S23. Thus, the search of the path is performed until the search is terminated by the end point or the loop with respect to the unsearched path.

In step S31, if it is determined that the unsearched path does not exist, the procedure goes to step S33. Then, the behavior predicting section 15 calculates the selection probability (occurrence probability) of each searched path. The behavior predicting section 15 supplies each path and its selection probability to the arrival time predicting section 16.

In step S34, the arrival time predicting section 16 extracts a path including the input destination from the path searched by the behavior predicting section 15, and then calculates the arrival probability for the destination. Specifically, in a case where a plurality of paths is present for the destination, the arrival time predicting section 16 calculates the sum of the selection probabilities of the plurality of paths as the arrival probability for the destination. In a case where only one path for the destination is present, the selection probability of the path becomes the arrival probability for the destination as it is.

In step S35, the arrival time predicting section 16 determines whether the number of the extracted paths is larger than a predetermined number which is set in advance as the presented number.

In step S35, if the number of the extracted paths is larger than the predetermined number, the procedure goes to step S36. Then, the arrival time predicting section 16 determines the paths of the predetermined number displayed on the display section 18. For example, the arrival time predicting section 16 can determine the paths of the predetermined number, in descending order of the selection possibility.

On the other hand, in step S35, if it is determined that the number of the selected paths is equal to or smaller than the predetermined number, the process of step S36 is skipped. That is, in this case, all paths for reaching the destination are displayed on the display section 18.

In step S37, the arrival time predicting section 16 calculates the arrival time of each path determined to be displayed on the display section 18. Further, the arrival time predicting section 16 supplies an image signal indicating the arrival probability for the destination and the path and the arrival time up to the destination to the display section 18.

In step S38, the display section 18 displays the arrival probability for the destination and the path and arrival time up to the destination, on the basis of the image signal supplied from the arrival time predicting section 16, and then the procedure is terminated.

As described above, in the first configuration example of the prediction system 1, the learning process is performed in which the activity state of the user is learned as the probabilistic state transition model from the time series data on the locations obtained by the location acquiring section 11. Further, the prediction system 1 predicts the arrival probability for the input destination and the path and arrival time to the destination, using the probabilistic state transition model expressed as the parameters $\lambda$ obtained by the learning process, and presents it to the user.

Thus, according to the first configuration example of the prediction system 1, it is possible to predict the arrival probability for the destination designated by the user and the path and arrival time to the destination, to thereby present it to the user.

2. Second Configuration in Japanese Patent Application No. 2009-208064

[Block diagram Illustrating Second Configuration Example in Japanese Patent Application No. 2009-208064]

Figure 10:
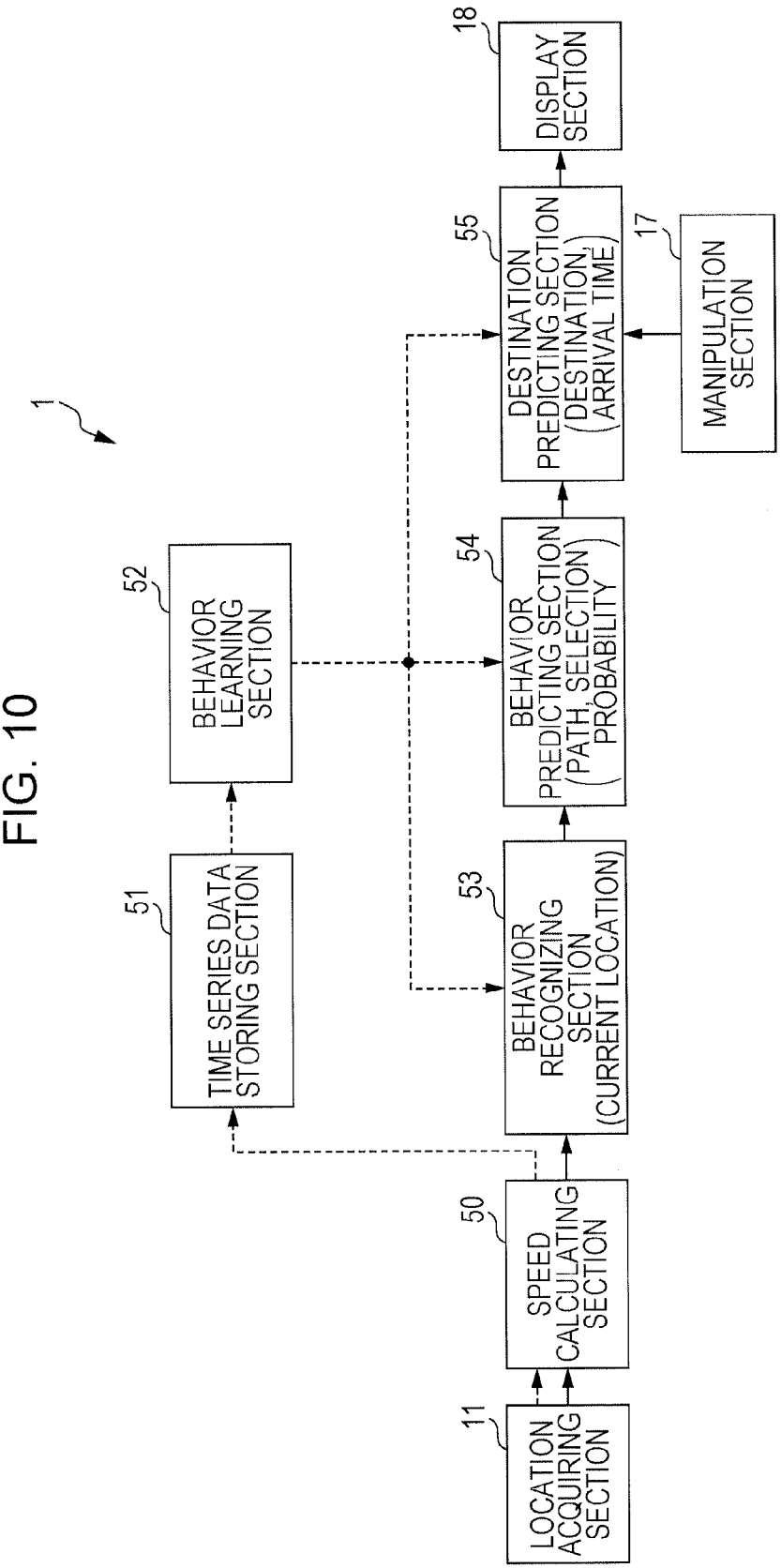
FIG. 10 is a block diagram illustrating a second configuration example of a prediction system in Japanese Patent Application No. 2009-208064.

FIG. 10 is a block diagram illustrating a second configuration example of the prediction system disclosed in Japanese Patent Application No. 2009-208064. In FIG. 10, the same components as in the above-described first configuration example are given the same reference symbols, and description will be omitted as necessary. (This is the case with the other figures.)

The prediction system 1 in FIG. 10 includes the location acquiring section 11, a speed calculating section 50, a time series data storing section 51, a behavior learning section 52, a behavior recognizing section 53, a behavior predicting section 54, a destination predicting section 55, the manipulation section 17 and the display section 18.

In the first configuration example, the destination is designated by the user, but in the second configuration example, the prediction system 1 predicts the destination on the basis of the time series data of the location data acquired by the location acquiring section 11. The predicted destination may be one or more than one. The prediction system 1 calculates the arrival probability, path and arrival time for the predicted destination and presents it to the user.

As for a residence, office, station, shopping center, restaurant or the like which is the destination, the user generally is stationary in the place for a predetermined time, and the movement speed of the user is close to almost zero. On the other hand, in a case where the user moves to the destination, the movement speed of the user is in a transition state of a specific pattern according to a movement means. Accordingly, it is possible to predict a place in the stationary state as the destination by recognizing a behavior state of the user, that is, whether the user is in a state of being stationary in the destination (stationary state) or in a state of movement (movement state), from information on the movement speed of the user.

The speed calculating section 50 calculates the movement speed from the location data supplied from the location acquiring section 11 at a predetermined time interval.

Specifically, when the location data obtained in a k-th step (k-th) at a predetermined time interval is expressed using a time $t_k$, a longitude $y_k$, a latitude $x_k$, a movement speed $vx_k$ in the k-th step in an x direction and a movement speed $vy_k$ in the k-th step in a y direction can be calculated by the following equation (5).

$$vx_k = \frac{x_k - x_{k-1}}{t_k - t_{k-1}} \qquad (5)$$
$$vy_k = \frac{y_k - y_{k-1}}{t_k - t_{k-1}}$$

In the equation (5), data on the latitude and longitude obtained from the location acquiring section 11 is used as it is, but the latitude and longitude may be converted into distances, or the process of converting the speed in the unit of per-hour or per-minute to be expressed may be appropriately performed as necessary.

Further, the speed calculating section 50 may calculate the k-th movement speed $v_k$ expressed by the following equation (6) and the change $\theta_k$ in the proceeding direction, from the movement speeds $vx_k$ and $vy_k$ obtained by the equation (5), and may make use of it.

$$v_k = \sqrt{vx_k^2 + vy_k^2} \qquad (6)$$
$$\theta_k = \sin^{-1}\left(\frac{vx_k \cdot vy_{k-1} - vx_{k-1} \cdot vy_k}{v_k \cdot v_{k-1}}\right)$$

If the movement speed $v_k$ and the change $\theta_k$ in the proceeding direction expressed by the equation (6) is used, it is possible to desirably extract characteristics in view of the following points, compared with the movement speeds $vx_k$ and $vy_k$ in the equation (5).

1. Since the data distribution of the movement speeds $vx_k$ and $vy_k$ is offset with reference to the latitude and longitude axes, if angles are different even with the same movement means (train, walking or the like), it may be difficult to recognize it. However, in the case of the movement speed $v_k$, such a possibility is decreased.

2. If the learning is performed by only the absolute value (|v|) of the movement speed, it is difficult to distinguish walking from being stationary due to the absolute value |v| generated by noises of the device. Thus, it is possible to reduce the influence of the noises in consideration of the change in the proceeding direction.

3. Since the change in the proceeding direction is small during the movement but the proceeding direction is not determined during the stationary period, if the change in the proceeding direction is used, it is easy to recognize the movement and the stationary state.

According to these reasons, the speed calculating section 50 calculates the movement speed $v_k$ and the change $\theta_k$ in the proceeding direction shown expressed by the equation (6), as data on the movement speed, and supplies it to the time series data storing section 12 or the behavior recognizing section 53, together with the location data.

Further, in order to remove the noise component before the calculation of the movement speed $v_k$ and the change $\theta_k$ in the preceding direction, the speed calculating section 50 performs a filtering process (pre-processing) using a movement average.

Hereinafter, the change $\theta_k$ in the proceeding direction is simply referred to as a proceeding direction $\theta_k$.

The location acquiring section 11 includes a function of outputting the movement speed. If such a location acquiring section 11 is adopted, the speed calculating section 50 is omitted, and the movement speed output by the location acquiring section 11 can be used as it is.

The time series data storing section 51 stores the location data and the time series data on the movement speeds, which are supplied from the speed calculating section 50.

The behavior learning section 52 learns the movement trace and the behavior state of the user as the probabilistic state transition model, on the basis of the time series data stored in the time series data storing section 51. That is, the behavior learning section 52 recognizes the current location of the user, and learns the user activity model for predicting the destination, the path and the arrival time as the probabilistic state transition model.

The behavior learning section 52 supplies the parameters λ of the probabilistic state transition model obtained by the learning process to the behavior recognizing section 53, the behavior predicting section 54 and the destination predicting section 55.

The behavior recognizing section 53 recognizes the current location of the user from the time series data on the locations and movement speeds, using the probabilistic state transition model of the parameters λ obtained by the learning process. The behavior recognizing section 53 supplies the node number of the current state node of the user to the behavior predicting section 54.

The behavior predicting section 54 proportionately searches the path which can be taken by the user, from the current location of the user, using the probabilistic state transition model of the parameters λ obtained through learning, and then calculates the selection probability for each selected path.

That is, the behavior recognizing section 53 and the behavior predicting section 54 are the same as the behavior recognizing section 14 and the behavior predicting section 15 in the first configuration example, except the use of the parameters λ obtained by learning the behavior state other than the movement path by adding the time series data on the movement speeds.

The destination predicting section 55 predicts the destination of the user using the probabilistic state transition model of the parameters λ obtained through learning.

Specifically, the destination predicting section 55 firstly presents destination candidates. The destination predicting section 55 uses places where the recognized behavior state of the user becomes the stationary state as the destination candidates.

Further, the destination predicting section 55 determines a destination candidate on a path searched by the behavior predicting section 54 among the presented destination candidates as the destination.

Next, the destination predicting section 55 calculates the arrival probability for each determined destination.

In a case where a plurality of destinations is detected, if all the destinations are displayed on the display section 18, it is hard to see all the destinations. Further, destinations having a low possibility to reach may be also displayed. Accordingly, in the first configuration example, in a similar way to the case where the searched paths are limited, the destinations to be displayed may be also limited so that only a predetermined number of destinations of a high arrival probability or destinations having an arrival probability of a predetermined value or higher are displayed. The numbers of the displayed destinations and paths may be different from each other.

If the destinations to be displayed are determined, the destination predicting section 55 calculates the arrival times of the paths up to the destinations and displays them on the display section 18.

If there are many paths to the destination, the destination predicting section 55 may reduce the paths to the destination into a predetermined number on the basis of the selection probability, and may calculate only the arrival time of the display paths, in a similar way to the first configuration example.

Further, if there are many paths to the destination, the display paths can be determined in descending order of the selection possibility, or in ascending order of the arrival time or in ascending order of the distance to the destination. In a case where the display paths are determined in ascending order of the arrival time, for example, the destination predicting section 55 firstly calculates the arrival times for all the paths to the destination, and determines the display paths on the basis of the calculated arrival time. In a case where the display paths are determined in ascending order of the distance to the destination, for example, the destination predicting section 55 firstly calculates the distances to the destination on the basis of information about the latitudes and longitudes corresponding to the state nodes, for all the paths to the destination, and then determines the display paths on the basis of the calculated distances.

[Detailed Configuration Example of Behavior Learning Section 52]

Figure 11:
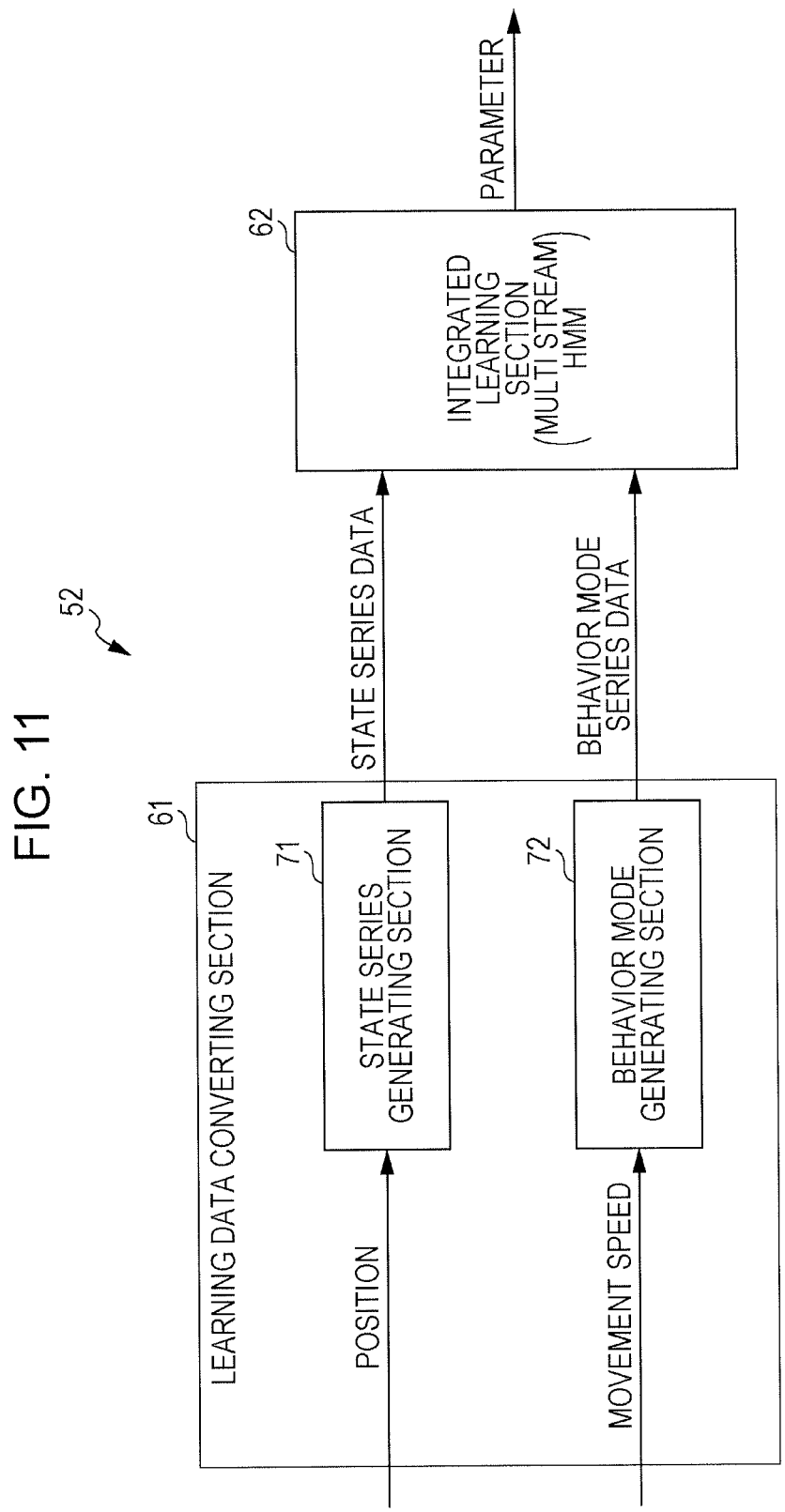
FIG. 11 is a diagram illustrating an example of a configuration which can be employed by a behavior learning section in FIG. 10.

FIG. 11 is a diagram illustrating an example of a configuration which the behavior learning section 52 in FIG. 10 can employ.

The behavior learning section 52 learns the movement trace and the behavior state of the user at the same time, using the time series data on the locations and movement speeds stored in the time series data storing section 51.

The behavior learning section 52 includes a learning data converting section 61 and an integrated learning section 62.

The learning data converting section 61 includes a state series generating section 71 and a behavior mode generating section 72. The state series generating section 71 converts time series data on the locations to time series data (state series data) on state nodes $s_i$, and supplies it to the integrated learning section 62. The behavior mode generating section 72 converts data on movement speeds to time series data on behavior modes (behavior mode series data), and supplies it to the integrated learning section 62.

The time series data on the locations supplied from the time series data storing section 12 is supplied to the state series generating section 71. The state series generating section 71 can adopt the same configuration as in the behavior recognizing section 14 in FIG. 1. That is, the state series generating section 71 recognizes the current activity state of the user, corresponding to the current location of the user input from the user activity model based on the parameters λ obtained through learning. Further, the state series generating section 71 sequentially supplies the current state node $s_i$ of the user to the integrated learning section 62, as the recognition result.

The time series data on the movement speeds supplied from the time series storing section 12 is supplied to the behavior mode generating section 72. The behavior mode generating section 72 recognizes the behavior state of the user corresponding to the supplied movement speeds, using the parameters λ obtained by learning the behavior state of the user as the probabilistic state transition model, and then sequentially supplies the recognition result to the integrated learning section 62 as the behavior mode. As the behavior state of the user recognized by the behavior mode generating section 72, it is necessary that at least a stationary state and a movement state exist. Further, the behavior mode of the movement state can be classified according to a movement means such as walking, bicycle, or vehicle.

[Classification of Behavior Mode]

Figure 12:
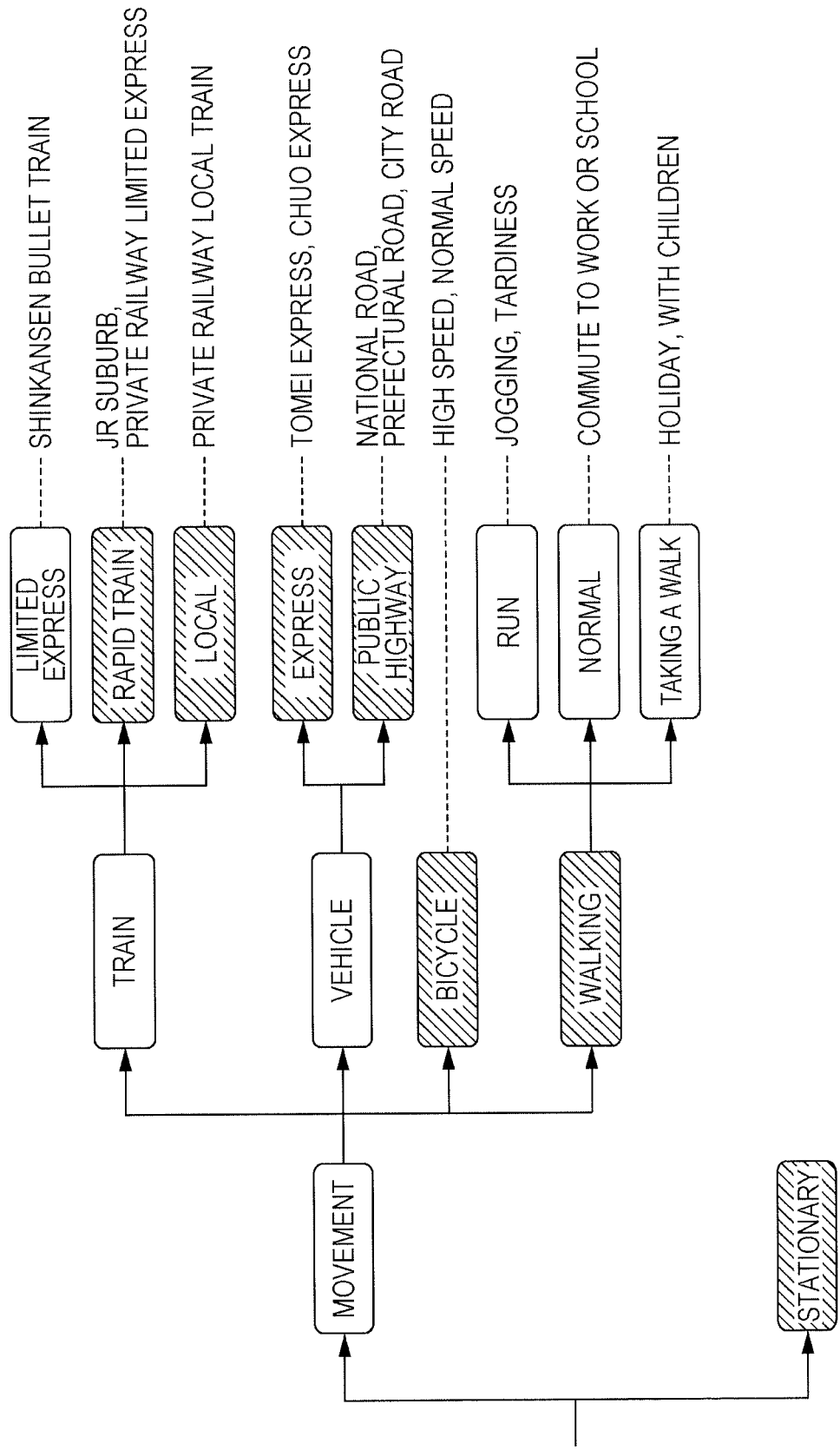
FIG. 12 is a diagram illustrating a behavior mode recognized by a prediction system 1.

FIG. 12 is a diagram illustrating a behavior state (behavior mode) of a user recognized by the behavior mode generating section 72.

As shown in FIG. 12, firstly, the behavior state of the user may be classified as the stationary state and the movement state. As described above, in the prediction system 1, it is necessary to classify the behavior state into the above-described two states as the behavior state of the user recognized by the behavior mode generating section 72, since it is necessary that at least the stationary state and the movement state exist, as described above.

Further, the movement state may be classified as train, vehicle (including bus), bicycle and walking, according to the movement means. The train may be classified as limited express, rapid, local and the like. The vehicle may be classified as express, public highway and the like. Further, walking may be classified as running, normal, stroll and the like.

In the prediction system 1, the behavior state of the user may be classified as "stationary", "train (rapid)", "train (local)", "vehicle (express)", "vehicle (public highway)", "bicycle" and "walking", as represented by oblique lines in FIG. 12. Further, the "train (limited express)" is omitted since learning data is unable to be obtained.

The classification method of the behavior mode is not limited to the example shown in FIG. 12. Further, the change in the movement speed according to the movement means is not significantly different according to the user, and thus, the time series data on the movement speeds as the learning data is not necessarily limited to a specific user which is a recognition target.

Returning to FIG. 11, the integrated learning section 62 integrally learns the time series data on a plurality of events (modals) by the probabilistic state transition model. The state series data is supplied to the integrated learning section 62 as time series data on first events, and the behavior mode series data is supplied to the integrated learning section 62 as time series data on second events. Accordingly, the integrated learning section 62 learns the parameters λ of the multi stream HMM which is the probabilistic state transition model indicating the activity state of the user, using the state series data and the behavior mode series data.

The multi stream HMM is an HMM in which data is output according to a plurality of different probabilistic rules, from the state node having the same transition probability as a normal HMM. In the multi stream HMM, an output probability density function $b_j(x)$ which is an observation probability parameter among the parameters λ is prepared for each piece of time series data and then updated.

If an output probability density function $b_j(x)$ of the time series data on the first events is a normal probability distribution of an average $\mu_s$ and a standard deviation $\sigma_{xs}$, and an output probability density function $b2_j(x)$ of the time series data on the second events is a normal probability distribution of the average $\mu_s$ and a standard deviation $\sigma_{ys}$, a likelihood $P(s_i|x_t, y_t)$ that time series data $x_t$ of the first events and time series data $y_t$ of the second events at a time t are output from the states $s_i$ is given by the following equation (7).

$$P(s \mid x_t, y_t) = \left[\frac{1}{\sqrt{2\pi\sigma_{x,s}^2}}\exp\left(-\frac{(x_t-\mu_s)^2}{2\sigma_{x,s}^2}\right)\right]^{W_x}\left[\frac{1}{\sqrt{2\pi\sigma_{y,s}^2}}\exp\left(-\frac{(y_t-\mu_s)^2}{2\sigma_{y,s}^2}\right)\right]^{W_y} \quad (7)$$

In the equation (7), $w_x$ and $w_y$ are weights, which indicate the level at which the time series data on the first and second events contributes to the learning model. The weights $w_x$ and $w_y$ may be a linear combination of logarithmic likelihoods of the respective events in consideration of the logarithmic likelihood. Accordingly, in the multi stream HMM, the likelihood of each state $s_i$ is obtained by linearly combining the likelihoods, which the states of the learning model have for respective streams, according to the logarithmic likelihood.

The likelihood of the state $s_i$ in the normal HMM which is an input of a single stream corresponds to a case where the weight $w_y$ is 0, without the term $y_t$, in the equation (7).

Except that the output probability density function $b_j(x)$ which is the observation probability parameter is individually updated for each piece of time series data, and that the likelihood is calculated by the equation (7), the learning process is the same as in the normal HMM.

In this example, since the time series data includes the state series data and the behavior mode series data, in the multi stream HMM of the integrated learning section 62, the behavior state of the user is learned (integrally learned) in such a manner that an index on a map and the behavior mode are associated with each other.

Specifically, the integrated learning section 62 learns the probability of each state node (probability that a specific state node is output) and the probability of the behavior mode output by each state node (probability that a specific behavior mode is output). According to the integrated model (multi stream HMM) obtained through learning, state nodes in which the behavior mode of the "stationary state" is likely to probabilistically output are obtained. Further, it is possible to recognize places of the destination candidates from the recognized state nodes. In addition, it is possible to recognize locations of the destinations from the latitude and longitude distribution indicated by the places of the destination candidates.

As described above, it is estimated that a location indicated by a state node having a high probability that the observed behavior mode becomes the "stationary state" is the stay location of the user. Further, as described above, since the location in the "stationary state" is the destination in many cases, it is possible to estimate the stay location as the destination.

The integrated learning section 62 supplies the parameters λ of the multi stream HMM indicating the behavior state of the user, obtained through learning, to the behavior recognizing section 14, the behavior predicting section 15 and the arrival time predicting section 16.

In the above-described example, in the state series generating section 71 and the behavior mode generating section 72, the modeling is performed by the HMM, and thus, the time series data on the locations and movement speeds supplied from the time series data storing section 12 is converted into the state series data and the behavior mode series data.

However, using different methods other than the above-described method, the data on the locations and movement speeds may be converted into the state series data and the behavior mode series data. For example, with respect to the behavior mode, the presence or absence of the movement of the user may be detected from the detection result of an acceleration or the like, using a motion sensor such as an acceleration sensor, or gyro sensor, differently from the location acquiring section 11, and the determination result for determination of the behavior mode may be obtained. In this case, the behavior mode generating section 72 may be omitted.

[Destination Arrival Time Prediction Process]

Next, the destination arrival time prediction process by means of the prediction system 1 in FIG. 10 will be described with reference to flowcharts in FIGS. 13 and 14.

Figure 13:
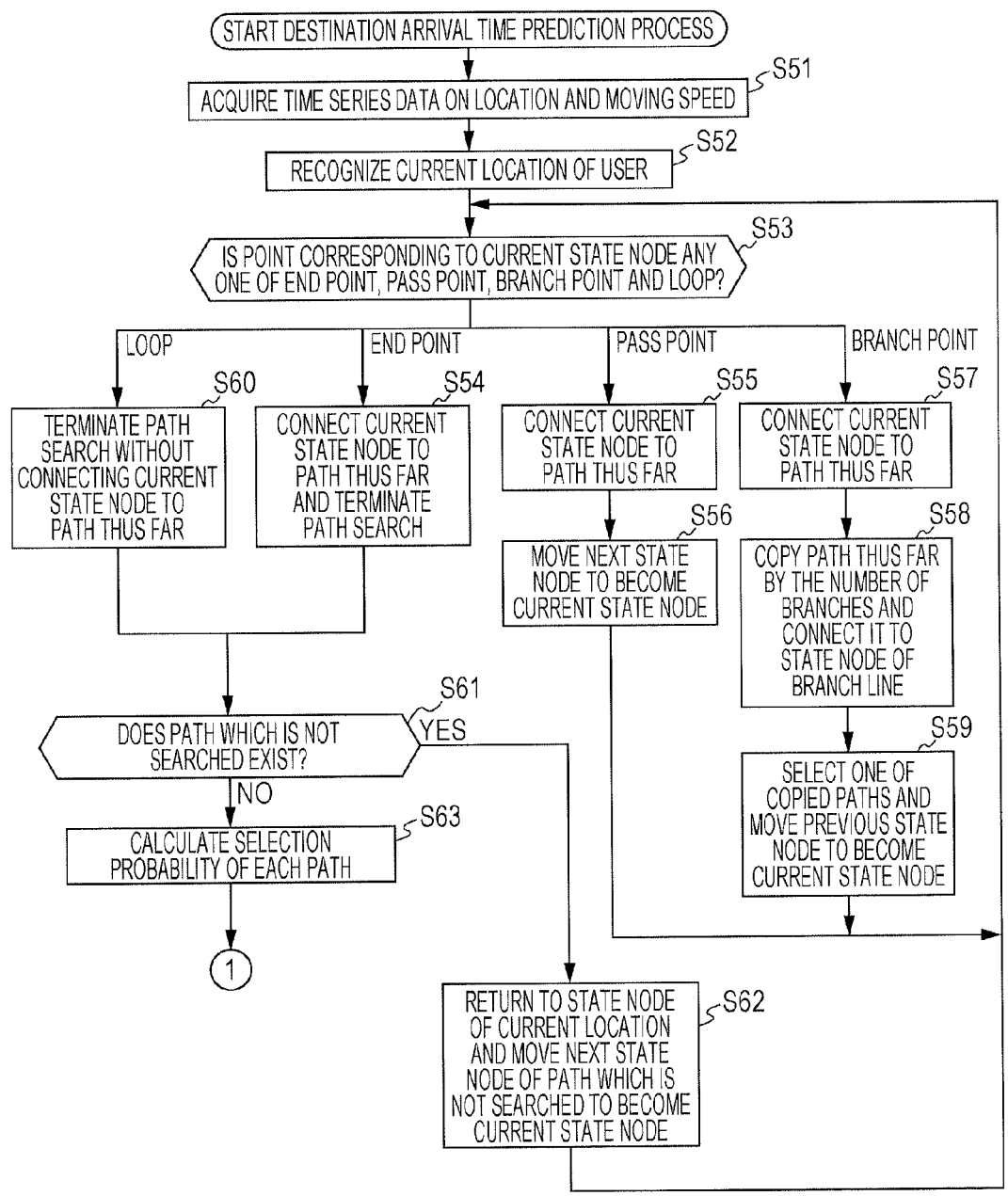
FIG. 13 is a flowchart illustrating an arrival time prediction process.
Figure 14:
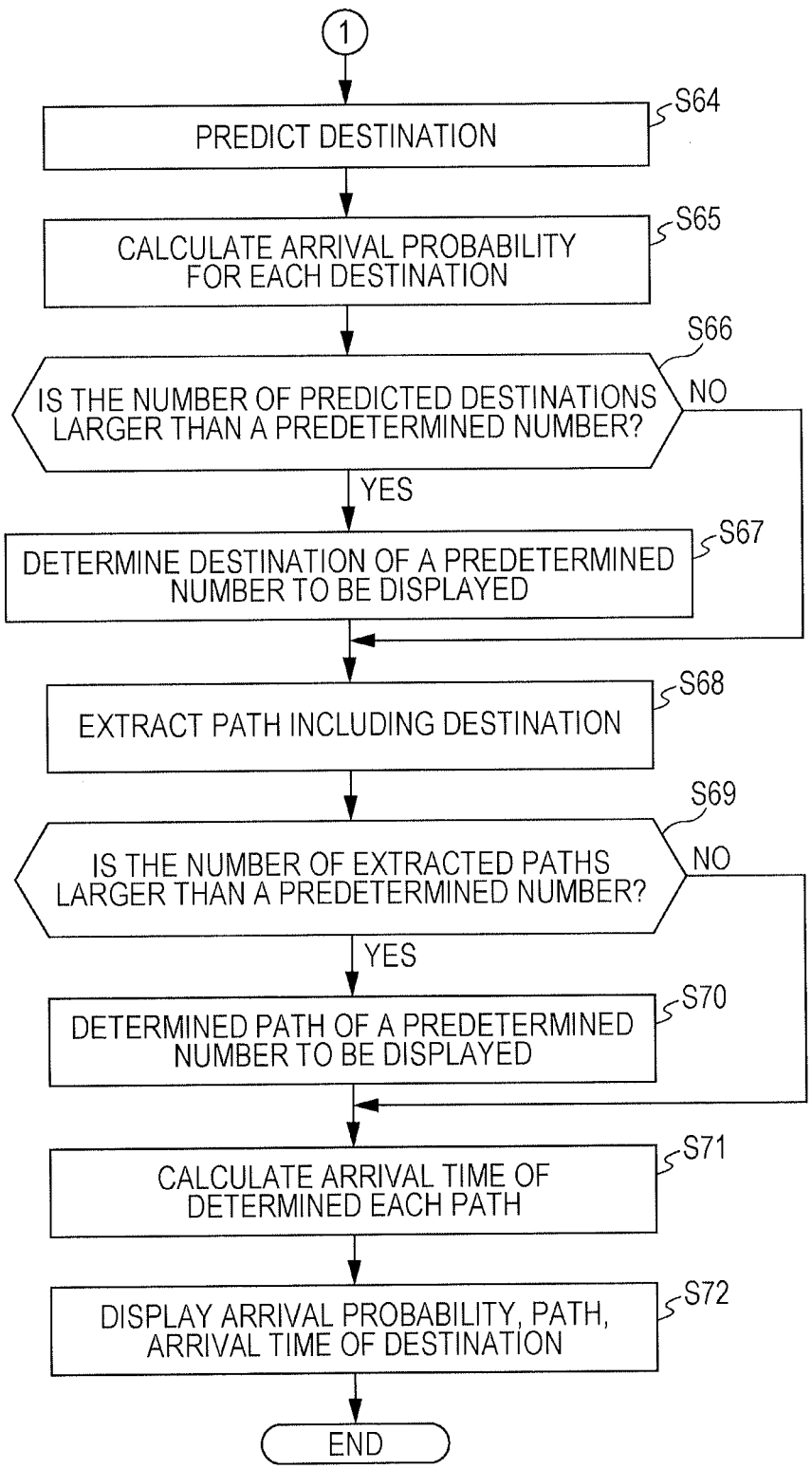
FIG. 14 is a flowchart illustrating an arrival time prediction process.

That is, FIGS. 13 and 14 illustrate flowcharts of the destination arrival time prediction process of predicting the destination from the time series data on the locations and movement speeds, calculating the path and arrival time up to the destination and presenting it to the user.

Processes of steps S51 to S63 in FIG. 13 are the same as steps S21 to S33 of the arrival time prediction process shown in FIG. 9, except that the time series data obtained in step S51 is data on the locations and movement speeds, and description thereof will be omitted.

Through the process of step S51 to S63 in FIG. 13, the current location of the user is recognized. Then, paths that the user can select are proportionately searched, and the selection probability of each path is calculated. Thereafter, the procedure goes to step S64 in FIG. 14.

In step S64, the destination predicting section 55 predicts the destinations of the user. Specifically, the destination predicting section 55 initially presents destination candidates. The destination predicting section 55 presents locations where the behavior state of the user is in the stationary state as the destination candidates. Further, the destination predicting section 55 determines the destination candidates on the paths searched by the behavior predicting section 54 from among the presented destination candidates, as the destinations.

In step S65, the destination predicting section 55 calculates the arrival probability for each destination. That is, with respect to the destination having a plurality of paths, the destination predicting section 55 calculates the sum of the selection probabilities of the plurality of paths, as the arrival probability of the destination. For the destination having only one path, the selection probability of the path becomes the arrival probability of the destination as it is.

In step S66, the destination predicting section 55 determines whether the number of the predicted destinations is larger than a predetermined number. In step S66, if it is determined that the number of the predicted destinations is larger than the predetermined number, the procedure goes to step S67. Then, the destination predicting section 55 determines the destinations of the predetermined number to be displayed on the display section 18. For example, the destination predicting section 55 can determine the paths of the predetermined number, in descending order of the arrival probability for the destination.

On the other hand, in step S66, if it is determined that the number of the predicted destinations is equal to or smaller than the predetermined number, the step S67 is skipped. That is, in this case, all the predicted destinations are displayed on the display section 18.

In step S68, the destination predicting section 55 extracts paths including the predicted destinations, from the paths searched by the behavior predicting section 54. In a case where a plurality of destinations is predicted, the path is extracted for each predicted destination.

In step S69, the destination predicting section 55 determines whether the number of the extracted paths is larger than a number predetermined as a presented number.

In step S69, if it is determined that the number of the extracted paths is larger than the predetermined number, the procedure goes to step S70. Then, the destination predicting section 55 determines the paths of the predetermined number to be displayed on the display section 18. For example, the destination predicting section 55 can determine the paths of the predetermined number, in descending order of the selection possibility.

On the other hand, in step S69, if it is determined that the number of the extracted paths is equal to or smaller than the predetermined number, the process of step S70 is skipped. That is, in this case, all the paths for reaching the destination are displayed on the display section 18.

In step S71, the destination predicting section 55 calculates the arrival time of each path determined to be displayed on the display section 18, and supplies an image signal indicating the arrival probability for the destination and the path and arrival time up to the destination to the display section 18.

In step S72, the display section 18 displays the arrival probability for the destination and the path and arrival time up to the destination, on the basis of the image signal supplied from the destination predicting section 55, and then the procedure is terminated.

As described above, according to the prediction system 1 in FIG. 10, it is possible to predict the destination from the time series data on the locations and movement speeds, to calculate the arrival probability for the destination and the path and arrival time up to the destination, and to present it to the user.

[Problems in Method According to Japanese Patent Application No. 2009-208064]

In the method according to Japanese Patent Application No. 2009-208064, in general, the learning model based on the HMM does not only learn values of the latitude and longitude for the input time series data on the locations, but also learns temporal connections of the anteroposterior relation thereof. Accordingly, for example, in a case where a movement path along which a user goes to and returns from a specific destination is learned by the HMM, in the case of a common location which is passed in both the going and returning, the going and the returning are distinguished from each other and different nodes are allocated thereto.

However, there is a case where the going and the returning are distinguished and the different nodes are not allocated thereto, according to a setting condition such as an initial state or the number of the nodes set in the learning model (HMM), a sampling interval of the time series data, or the like. Thus, for example, in the prediction process, there is a case where a path is predicted to return to a departure location from the common location in the middle of a returning path.

3. First Embodiment of the Present Invention

Thus, embodiments which can prevent the path from being predicted to return to the departure location from the common location in the middle of the returning path, and can accurately predict a future path after a current time and an elapsed time compared with the above-described Japanese Patent Application No. 2009-208064, will be described. That is, exemplary embodiments of the present invention will be described.

[Block Diagram Illustrating First Embodiment of the Present Invention]

Figure 15:
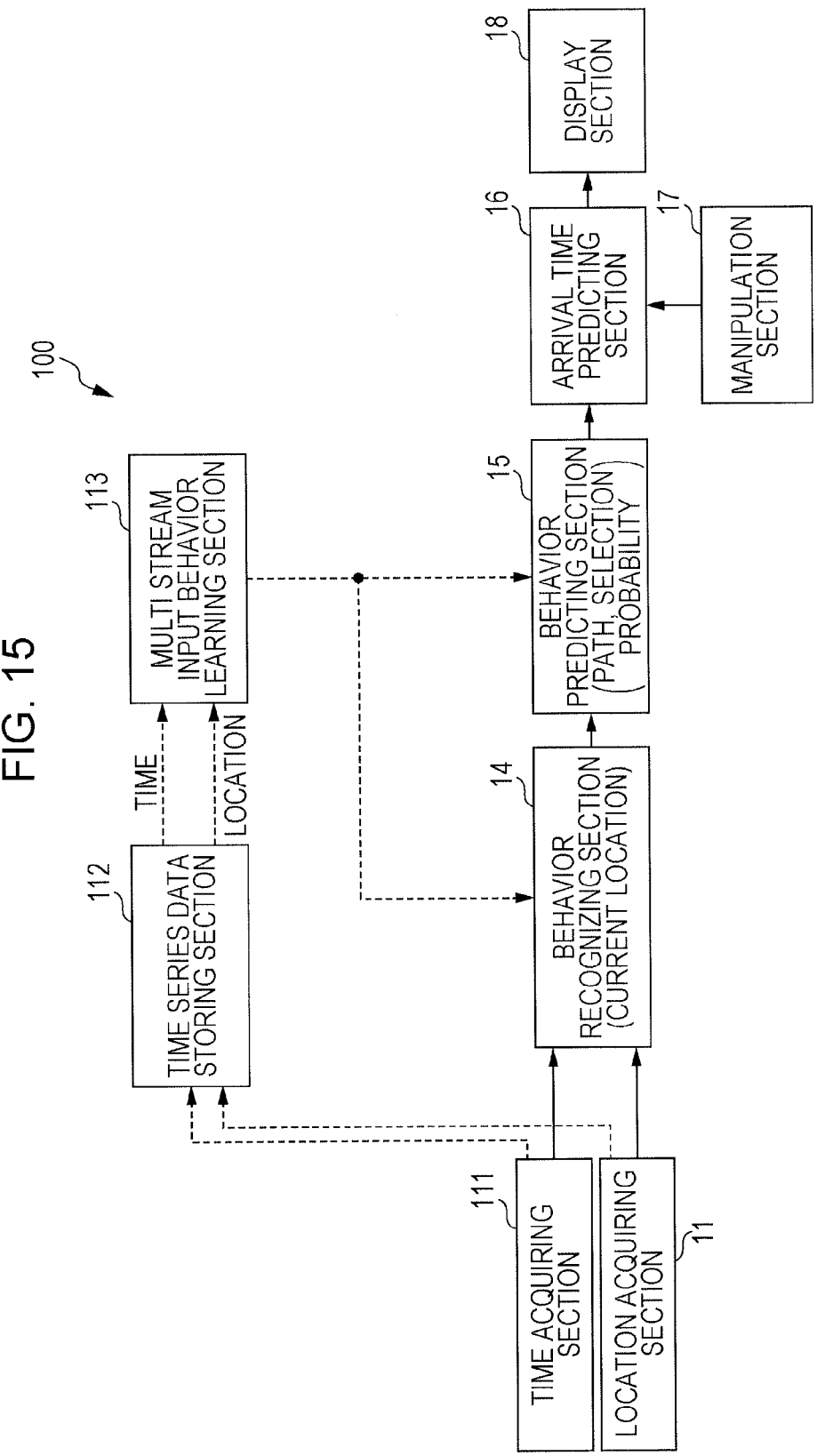
FIG. 15 is a block diagram of a prediction system according to a first embodiment of the present invention.

FIG. 15 is a block diagram illustrating a prediction system according to a first embodiment of the invention.

In FIG. 15, the same components as in those shown in FIG. 1 are given the same reference symbols, and description thereof will be omitted.

In the prediction system 1 shown in FIG. 1, the activity state of the user is learned on the basis of the time series data on locations (latitude and longitude). In this respect, in a prediction system 100 shown in FIG. 15, the activity state of the user is learned on the basis of both of time series data on locations and time series data on times. As the learning model in the present embodiment, the HMM having a sparse restriction is adopted.

The prediction system 100 in FIG. 15 includes a location acquiring section 11, a behavior recognizing section 14, a behavior predicting section 15, an arrival time predicting section 16, a manipulation section 17, a display section 18, a time acquiring section 111, a time series data storing section 112 and a multi stream input behavior learning section 113.

The time acquiring section 111 sequentially acquires a current time in a learning process, and then supplies it to the time series data storing section 112. On the other hand, the time acquiring section 111 sequentially acquires the current time in the prediction process, and then supplies it to the behavior recognizing section 14. In a case where the location acquiring section 11 is configured by a GPS sensor, for example, the GPS sensor can also acquire the time generally, and thus, the time acquiring section 111 can be also configured by the GPS sensor. Further, it is possible to use other apparatuses or sensors having a timepiece function.

The time series data storing section 112 stores the time series data on the locations supplied from the location acquiring section 11 and the time series data on the times supplied from the time acquiring section 111. Further, the time series data storing section 112 supplies the time series data on the times and locations, to the multi stream input behavior learning section 113.

The multi stream input behavior learning section 113 learns the activity state of the user using the probabilistic state transition model, on the basis of the time series data on the locations and the time series data on the times, and supplies the parameters λ obtained as the result to the behavior recognizing section 14 and the behavior predicting section 15.

Here, the time series data on the locations and the time series data on the times have different characteristics, and thus, the multi stream input behavior learning section 113 learns the parameters λ of the multi stream HMM, in a similar way to the integrated learning section 62 in FIG. 11. That is, the time series data on the above-described first events corresponds to the time series data on the locations, and the time series data on the second event corresponds to the time series data on the times.

In the prediction process, the time series data on the locations from the location acquiring section 11 and the time series data on the times from the location acquiring section 111 are supplied to the behavior recognizing section 14.

The behavior recognizing section 14 recognizes the current behavior state of the user corresponding to the current location of the user, by the user activity model (multi stream HMM) obtained through learning. The behavior predicting section 15 searches the paths from the recognized current location of the user. The arrival time predicting section 16 extracts the paths including the destination designated by the user from the paths searched by the behavior predicting section 15, and predicts the time up to the destination for each extracted path.

Figure 8:
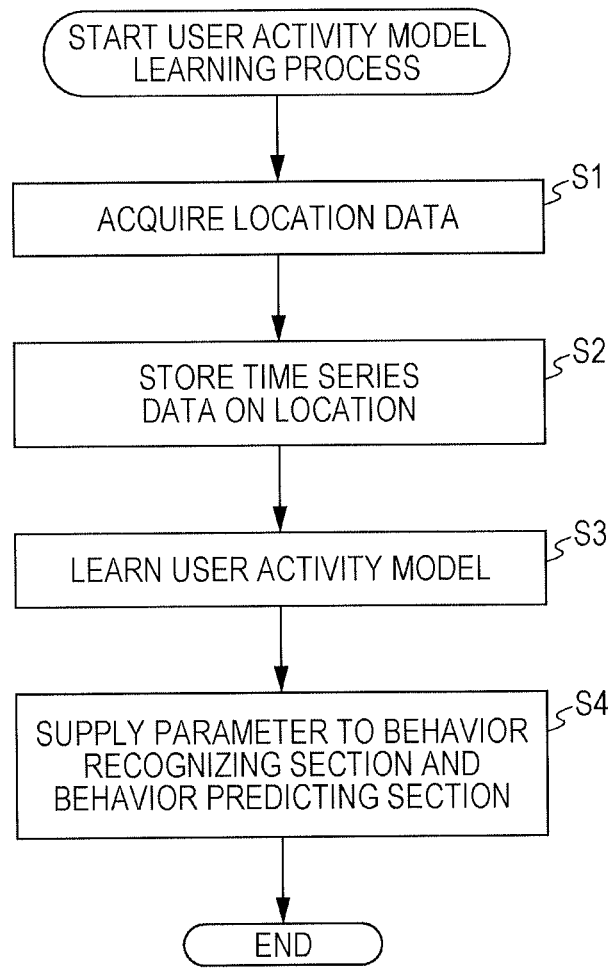
FIG. 8 is a flowchart illustrating a user behavior model learning process.

The learning process in the prediction system 100 in FIG. 15 is the same as in FIG. 8 except that the probabilistic state transition model indicating the user activity model which is a learning target is the multi stream HMM, and thus its description will be omitted.

Further, the prediction process in the prediction system 100 in FIG. 15 is also the same as in FIG. 9 except that the user activity model is the multi stream HMM, and thus its description will be omitted.

According to the first embodiment of the prediction system 100 in FIG. 15, in the prediction process, a state node which is the nearest to the time series data on the locations and the times supplied in real time is recognized as the current activity state of the user. For example, since the learning model learns as different times between the going and returning, different state nodes are recognized between the going and returning. Thus, as the state node which is the nearest to the state node at the current time obtained in real time is searched, the returning path is not predicted in the middle of the going movement. That is, it is possible to accurately predict a future path after a current time and an elapsed time, and to learn learning parameters therefor.

4. Second Embodiment of the Invention

[Block Diagram Illustrating the Second Embodiment of the Invention]

Next, a second embodiment of the prediction system according to the present invention will be described.

Figure 16:
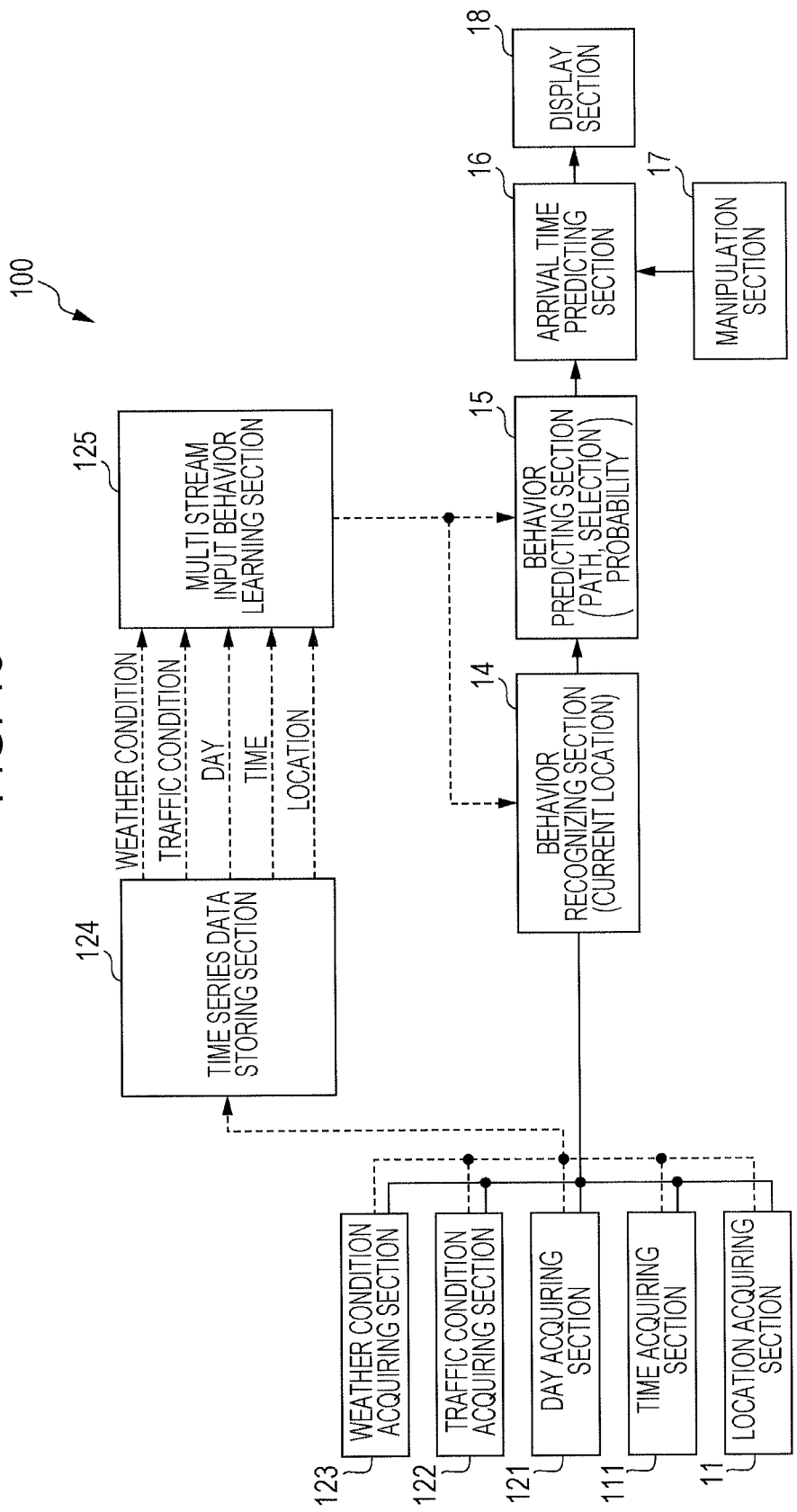
FIG. 16 is a block diagram of a prediction system according to a second embodiment of the present invention.

FIG. 16 is a block diagram illustrating the prediction system according to the second embodiment of the present invention.

In FIG. 16, the same components as in those shown in FIG. 15 are given the same reference symbols, and description thereof will be omitted.

In the first embodiment of the prediction system 100 shown in FIG. 15, the activity state of the user is learned by the HMM having the sparse restriction on the basis of only the time series data on the locations and the times. Further, if a large amount of information is given to the learning model for learning the activity state of the user, specifically, it is possible to recognize the activity state of the user.

Thus, in the second embodiment of the prediction system 100 in FIG. 16, the multi stream HMM receives as an input time series data on additional information such as a day, traffic condition, or weather condition, in addition to the time series data on the locations and the times, and performs learning.

The prediction system 100 in FIG. 16 additionally includes a day acquiring section 121, a traffic condition acquiring section 122 and a weather condition acquiring section 123, compared with the prediction system 100 in FIG. 15. Further, instead of the time series data storing section 112 and the multi stream input behavior learning section 113 in FIG. 15, a time series data storing section 124 and a multi stream input behavior learning section 125 are installed.

The day acquiring section 121 sequentially acquires the day at a current time point at a predetermined interval. In the learning process, the acquired time series data on days is supplied to the time series data storing section 124. On the other hand, in the prediction process, the acquired time series data on the days is supplied to the behavior recognizing section 14.

The traffic condition acquiring section 122 sequentially acquires the traffic condition at the current time point at a predetermined interval. In the learning process, the acquired time series data on the traffic conditions is supplied to the time series data storing section 124. On the other hand, in the prediction process, the acquired time series data on the traffic conditions is supplied to the behavior recognizing section 14.

The weather condition acquiring section 123 sequentially acquires the weather condition at the current time point at a predetermined interval. In the learning process, the acquired time series data on the weather situation is supplied to the time series data storing section 124. On the other hand, in the prediction process, the acquired time series data on the weather conditions is supplied to the behavior recognizing section 14.

The day acquiring section 121, the traffic condition acquiring section 122, and the weather condition acquiring section 123 can be configured by a communication apparatus which is connected to a server for providing the respective information on the day, traffic conditions and weather conditions and acquires the information. Further, an acquiring interval at the time when the location acquiring section 11, the time acquiring section 111, the day acquiring section 121, the traffic condition acquiring section 122 and the weather condition acquiring section 123 respectively acquires the information is not necessarily the same.

The time series data storing section 124 stores time series data on the locations, times, days, traffic conditions and weather conditions, which is supplied from the respective sections, and supplies it to the multi stream input behavior learning section 125.

In this embodiment, in addition to the time series data on the locations and the times, the three pieces of time series data on the days, traffic conditions and weather conditions are input to the multi stream input behavior learning section 125, but any one or two of the day, traffic conditions and weather conditions may be used as the time series data.

The respective time series data on the days, traffic conditions and weather conditions is independently supplied to the behavior recognizing section 14 and the time series data storing section 124. Here, in FIG. 16, for simplicity of illustration, a supply line of the time series data is integrated into a single line. This is the case with the case in FIG. 17 as described later.

The multi stream input behavior learning section 125 learns the activity state of the user by the probabilistic state transition model on the basis of the plurality of input multi streams, and supplies the parameters λ obtained as the result to the behavior recognizing section 14 and the behavior predicting section 15. That is, the time series data on the locations, times, days, traffic conditions and weather conditions is supplied to the multi stream input behavior learning section 125, and performs learning of the multi stream HMM in which five multi streams are input.

The learning process and the prediction process of the prediction system 100 according to the second embodiment are the same as in the first embodiment in FIG. 15.

According to the second embodiment of the prediction system 100 in FIG. 16, the learning process and the prediction process are performed with respect to the time series data on the additional information about the days, traffic conditions, weather conditions and the like in addition to the time series data on the times and the locations. Accordingly, in addition to the case of the going and returning which can be discerned through the time series data on the times, for example, in a case where the movement path becomes different according to the day, in a case where the movement path becomes different according to the weather or traffic conditions, or in like cases, it is possible to recognize the movement path as different state nodes. Specifically, in a case where the user moves toward the nearest station from the residence, if it is a weekday, the office is predicted as a destination, and if it is a holiday, places other than the office can be predicted as the destination.

That is, according to the second embodiment of the prediction system 100, it is possible to more accurately predict a future path and an elapsed time after the current time, and to learn the learning parameters therefor.

However, if the number of the time series data (streams) for learning input to the multi stream HMM is increased, it is necessary to increase the number of the state nodes, and the time for the learning is also increased. With respect to the additional information on the day, traffic conditions, weather conditions and the like, there is a method for performing prediction by classifying the time series data on the times and locations according to each predetermined condition, by individually learning the learning model for each condition, and by selecting the learning model which satisfies the condition of the current time point. In this case, the same number as the total number of the node numbers of the respective learning models is necessary.

Further, weights (corresponding to the weights $w_x$, $w_y$ in the equation (7)) of the time series data on the additional information on the day and the like, which is used to determine the activity of the user, are not the same as the time series data on the times and locations, and may be different according to users, types of activities, or days.

5. Third Embodiment of the Present Invention

Thus, an embodiment will be described in which the learning model (multi stream HMM) performs learning using only the time series data on the times and locations as an input, the additional information on the day, traffic conditions, weather conditions and the like is given as an additional condition, and thus it is possible to more simply and accurately perform prediction in consideration of the additional information.

[Block Diagram Illustrating Third Embodiment of the Present Invention]

Figure 17:
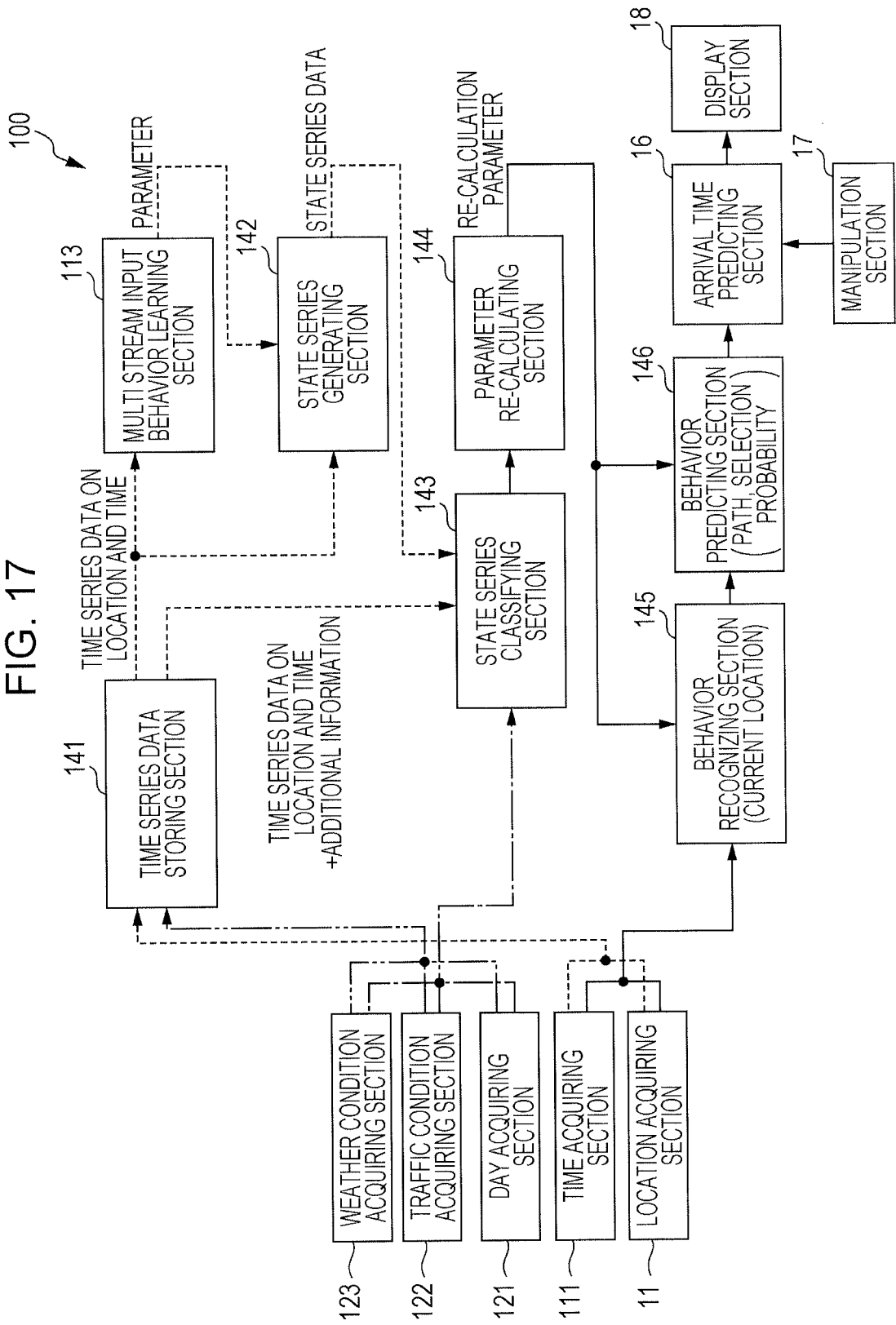
FIG. 17 is a block diagram of a prediction system according to a third embodiment of the present invention.

FIG. 17 is a block diagram illustrating the prediction system according to a third embodiment of the present invention.

In FIG. 17, the same components as in those shown in FIG. 15 or 16 are given the same reference symbols, and description thereof will be omitted.

In the third embodiment of the prediction system 100 in FIG. 17, a learning apparatus for calculating the parameters λ of the learning model from the supplied time series data, includes a time series data storing section 141, a multi stream input behavior learning section 113 and a state series generating section 142.

On the other hand, a prediction apparatus which predicts a path to the destination of the user and an arrival time from the supplied time series data includes a state series classifying section 143, a parameter re-calculating section 144, a behavior recognizing section 145 and a behavior predicting section 146.

The time series data storing section 141 stores the time series data on locations, times, days, traffic conditions and weather conditions, supplied from each section, in the learning process. The time series data storing section 141 supplies the time series data on the locations and the times to the multi stream input behavior learning section 113, and the time series data on the additional information about days and the like to the state series classifying section 143.

The multi stream input behavior learning section 113 learns a user activity model on the basis of the time series data on the locations and the times, in a similar way to the first embodiment. As the user activity model, the multi stream HMM which is a probabilistic state transition model is adopted. The parameters λ of the multi stream HMM obtained as a learning result are supplied to the state series generating section 142.

The state series generating section 142 converts the time series data on the locations and the times, supplied from the time series data storing section 141, to the time series data on the recognized state nodes (hereinafter, referred to as state series data), and then supplies it to the state series classifying section 143. Specifically, the state series generating section 142 recognizes the activity state of the user at that time, from the user activity model based on the parameters λ supplied from the multi stream input behavior learning section 113. Further, the state series generating section 142 sequentially supplies the state nodes of the user which is a recognition result to the state series classifying section 143.

To the state series classifying section 143 are supplied the time series data on the additional information on days and the time series data on the locations and the times, from the time series data storing section 141, in the learning process. Further, to the state series classifying section 143 is supplied the time series data corresponding to the time series data on the locations and the times including the additional information, from the state series generating section 142, in the learning process.

The state series classifying section 143 correspondingly stores the time series data on the locations and the times including the additional information and the state series data in the storing section. Thus, the state series classifying section 143 recognizes that the state series data corresponding to the time series data on the locations and the times used as the learning data is data corresponding to a certain additional condition (condition determined by the additional information).

On the other hand, in the prediction process, the time series data on the additional information is supplied in real time to the state series classifying section 143. That is, the time series data on the days, traffic conditions and weather conditions at a current time point is supplied to the state series classifying section 143, from the day acquiring section 121, the traffic condition acquiring section 122 and the weather condition acquiring section 123, respectively.

The state series classifying section 143 selects only the state series data which satisfies the supplied additional condition in real time and the time series data on the locations and the times, from the state series data and the time series data on the locations and the times stored in the learning process, and supplies them to the parameter re-calculating section 144.

The parameter re-calculating section 144 re-calculates the parameters λ of the multi stream HMM only by a statistical process in the prediction process. That is, the parameter re-calculating section 144 re-calculates the parameters λ of the multi stream HMM calculated for the time series data on the locations and the times in all additional conditions, using only the time series data on the locations and the times which satisfies the additional information at the current time point. Actually, the parameters λ are re-calculated using the state series data corresponding to the time series data on the locations and the times which satisfies the additional information at the current time point. The parameters λ calculated by the parameter re-calculation process of the parameter re-calculating section 144 are referred to as re-calculation parameters λ'.

As described above, since the state series classifying section 143 and the parameter re-calculating section 144 calculate the parameters of the learning model used in the prediction process, the state series classifying section 143 and the parameter re-calculating section 144 may be a part of the learning apparatus.

In the prediction process, to the behavior recognizing section 145 are supplied the time series data on the locations from the location acquiring section 11 and the time series data on the times from the time acquiring section 111. The behavior acquiring section 145 recognizes the current activity state of the user, corresponding to the current location of the user, using the user activity model (multi stream HMM) through the re-calculation parameters λ' supplied from the parameter re-calculating section 144. Accordingly, the behavior recognizing section 145 recognizes the current activity state of the user using only the time series data on the locations and the time series data on the times.

The behavior predicting section 146 searches selectable paths from the current location of the user, using the user activity model through the re-calculation parameters λ' supplied from the parameter re-calculation section 144. The arrival time predicting section 16 extracts paths including the destination designated by the user, from the paths searched by the behavior predicting section 15, and then predicts the time up to the destination for the extracted each path.

[Configuration Example of Parameter Re-Calculating Section 144]

Figure 18:
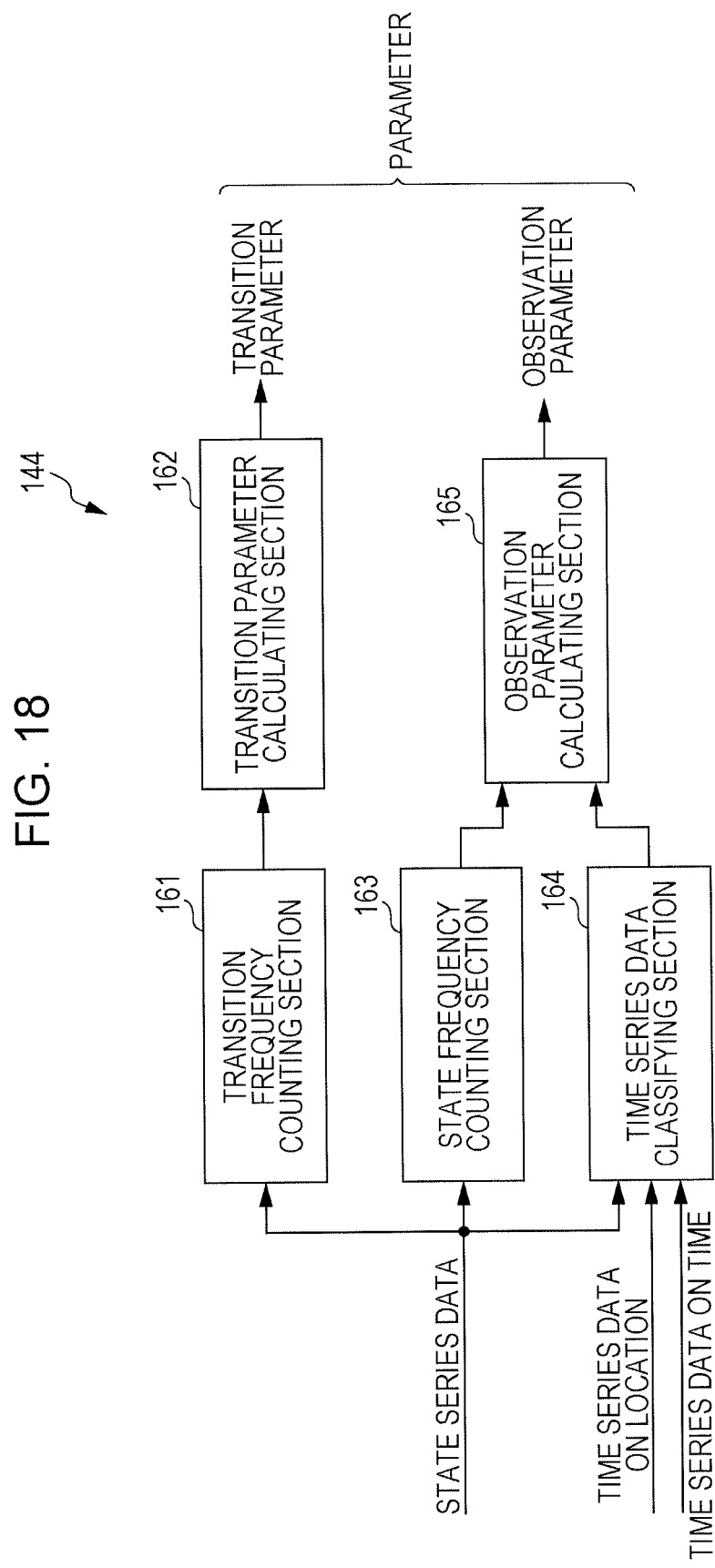
FIG. 18 is a block diagram illustrating a detailed configuration example of a parameter re-calculating section.

FIG. 18 illustrates a detailed configuration example of the parameter re-calculating section 144.

The parameter re-calculating section 144 re-calculates the parameters λ using the state series data corresponding to the time series data on the locations and the times which coincides with the additional information at the current time point.

The parameter re-calculating section 144 includes a transition frequency counting section 161, a transition parameter calculating section 162, a state frequency counting section 163, a time series data classifying section 164, and an observation parameter calculating section 165.

The transition frequency counting section 161 counts the frequency of each state transition, using the state series data supplied from the state series classifying section 143 as a target. That is, if the frequency (count value) of a path for moving from a state node $s_i$ to a state node $s_j$ is expressed as $n_{ij}$, the transition frequency counting section 161 calculates a frequency $n_{ij}$ (i=1 to N, j=1 to N, and N is a final node number of time series data (that is, the number of nodes)) of each state transition, using the state series data supplied from the state series classifying section 143 as a target.

The transition parameter calculating section 162 calculates transition parameters corresponding to the state transition probability $a_{ij}$ of the HMM. Specifically, the transition parameter calculating section 162 calculates a transition probability $A_{ij}$ by the following equation (8), on the basis of the frequency $n_{ij}$ of each state transition supplied from the transition frequency counting section 161.

$$A_{ij} = \frac{n_{ij}}{\sum_{j=1}^{N} n_{ij}} \tag{8}$$

The transition probability $A_{ij}$ that the state transition is not generated becomes zero, through the equation (8). In the learning model in which a normal HMM is used, if the repetition number is not sufficient, it is difficult to reduce the probability of the transition which has not been previously generated. However, according to the equation (8), the transition probability $A_{ij}$ that the state transition is not generated can be zero. This characteristic is significantly advantageous in reducing an unnecessary path search, in an algorithm of searching a future path possibility.

The transition parameter calculating section 162 outputs the calculated transition probability $A_{ij}$ as the transition parameters corresponding to the HMM state transition probability $a_{ij}$.

The state frequency counting section 163 counts the state frequency, using the state series data supplied from the state series classifying section 143 as the target. That is, the state frequency counting section 163 counts the total number $cnt_i$ of the respective state nodes $s_i$, using the state series data supplied from the state series classifying section 143 as the target. The total number $cnt_i$ of the respective state nodes si which is a count result is supplied to the observation parameter calculating section 165.

The state series data and the time series data on the locations and the times is supplied from the state series classifying section 143 to the time series data classifying section 164.

The time series data classifying section 164 classifies the location data x sequentially supplied from the state series classifying section 143 according to the state node, for grouping. Set data $X_i$ of the location data in the state $s_i$ can be expressed as the following equation (9).

$$X_i = \{x_{i,1}, x_{i,2}, \ldots, x_{i,cnt_i}\} \tag{9}$$

Since the total number of the state nodes $s_i$ is $cnt_i$, the number of elements of the set data $X_i$ becomes $cnt_i$. The location data x which is each element of the set data $X_i$ is two-dimensional data including the latitude and the longitude, for example, but is expressed like one-dimensional data in an abbreviated manner.

Further, the time series data classifying section 164 classifies time data t sequentially supplied from the state series classifying section 143 according to the state node, for grouping. Set data $T_i$ of the time data in the state nodes $s_i$ can be expressed as the following equation (10).

$$T_i = \{t_{i,1}, t_{i,2}, \ldots, t_{i,cnt_i}\} \tag{10}$$

The number of elements of the set data $T_i$ in the equation (10) is also $cnt_i$.

The time series data classifying section 164 supplies a classifying result obtained by classifying the time series data on the locations and the times according to the state node as described above, to the observation parameter calculating section 165. In other words, the time series data classifying section 164 supplies the set data X and the set data T of the respective state nodes to the observation parameter calculating section 165.

The observation parameter calculating section 165 calculates observation parameters of the respective time series data on the locations and the times.

As the observation parameters of the time series data on the locations, the observation parameter calculating section 165 calculates an average value $\mu 1_i$ of the state nodes $s_i$ and a standard deviation $\sigma 1_i$, using the total number $cnt_i$ of the state nodes $s_i$ from the state frequency counting section 163 and the set data $X_i$ from the time series data classifying section 164.

$$\mu 1_i = \frac{1}{cnt_i} \sum_{j=1}^{cnt_i} x_{i,j} \tag{11}$$

$$\sigma 1_i = \sqrt{\frac{1}{cnt_i} \sum_{j=1}^{cnt_i} x_{i,j}^2 - \mu 1_i^2} \tag{12}$$

The average value $\mu 1_i$ of the state nodes $s_i$ and the standard deviation $\sigma 1_i$ are observation probabilities of the location data x in the state nodes $s_i$, and correspond to output probability density functions $b1_i(x)$ of the multi stream HMM output by the above-described multi stream input behavior learning section 113 (in FIG. 17).

Further, as the observation parameters of the time series data on the times, the observation parameter calculating section 165 calculates an average value $\mu2_i$ of the state nodes $s_i$ and a standard deviation $\sigma2_i$, using the total number $cnt_i$ of the state nodes $s_i$ from the state frequency counting section 163 and the set data $T_i$ from the time series data classifying section 164.

$$\mu2_i = \frac{1}{cnt_i} \sum_{j=1}^{cnt_i} x_{i,j} \qquad (13)$$

$$\sigma2_i = \sqrt{\frac{1}{cnt_i} \sum_{j=1}^{cnt_i} x_{i,j}^2 - \mu2_i^2} \qquad (14)$$

The average value $\mu2_i$ of the state nodes $s_i$ and the standard deviation $\sigma2_i$ are observation probabilities of the time data t in the state nodes $s_i$, and correspond to output probability density functions $b2_i(x)$ of the multi stream HMM output by the above-described multi stream input behavior learning section 113 (in FIG. 17).

In consideration of the case where the number of the elements is small, the standard deviations $\sigma1_i$ and $\sigma2_i$ may be restricted to be larger than a predetermined value, or the standard deviations learned in the multi stream input behavior learning section 113 may be used.

With such a configuration, the parameter re-calculating section 144 can calculate parameters of the probabilistic state transition model of multi modals, from the state series data supplied from the state series generating section 142 and the time series data on the locations and the times.

[Learning Process of Prediction System 100 According to the Third Embodiment]

Figure 19:
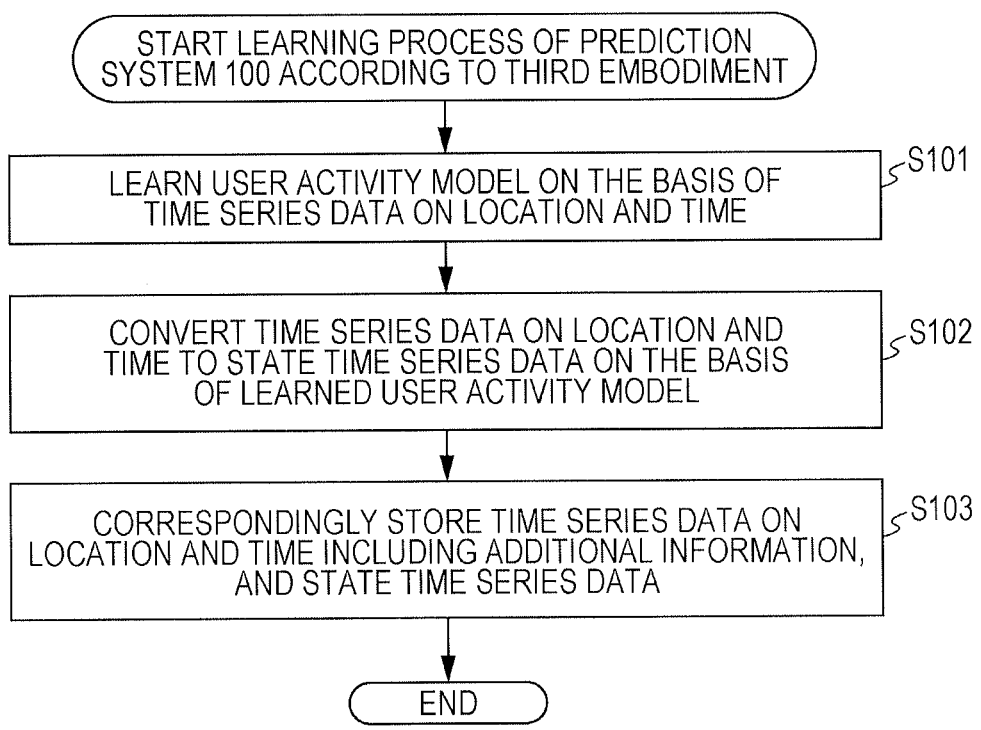
FIG. 19 is a flowchart illustrating a learning process of a prediction system according to a third embodiment of the present invention.

Next, a learning process of the prediction system 100 according to the third embodiment will be described with reference to a flowchart in FIG. 19. It is assumed that before starting the process, the time series data on the locations and the times including additional information, which is the learning data, is already stored in the time series data storing section 141.

Firstly, in step S101, the multi stream input behavior learning section 113 learns the user activity model on the basis of the time series data on the locations and the times stored in the time series data storing section 141. That is, the multi stream input behavior learning section 113 calculates the parameters $\lambda$ of the multi stream HMM, on the basis of the time series data on the locations and the times stored in the time series data storing section 141. The calculated parameters $\lambda$ of the calculated multi stream HMM are supplied to the state series generating section 142.

In step S102, the state series data generating section 142 converts the time series data on the locations and the times obtained from the time series data storing section 141 to the state series data, on the basis of the user behavior model including the parameters $\lambda$ supplied from the multi stream input behavior learning section 113, and then supplies it to the state series classifying section 143.

In step S103, the time series data storing section 141 supplies the time series data on the locations and the times supplied to the state series generating section 142 to the state series classifying section 143, including the additional information. The state series classifying section 143 correspondingly stores the time series data on the locations and the times including the additional information from the time series data storing section 141 and the state series data from the state series generating section 142 in a storing section, and then the learning process is terminated.

[Learning Process of Prediction System 100 According to the Third Embodiment]

Next, a prediction process of the prediction system 100 according to the third embodiment will be described with reference to a flowchart in FIG. 20.

Firstly, in step S121, the state series classifying section 143 acquires additional information at the current time point. Further, in step S122, the state series classifying section 143 selects only the state series data and the time series data on the locations and the times, which coincide with the additional information at the current time point, from the state series data and the time series data on the locations and the times stored in the learning process, and then supplies them to the parameter re-calculating section 144.

In step S123, the parameter re-calculating section 144 performs the parameter re-calculation process of re-calculating the parameters $\lambda$ of the multi stream HMM calculated by the multi stream input behavior learning section 113 in the learning process, so as to coincide with the additional information at the current time point. In the parameter re-calculation process, the parameters $\lambda$ of the multi stream HMM are re-calculated, through a statistical process using the state series data and the time series data on the locations and the times which are selected. The parameter re-calculating section 144 supplies re-calculated parameters $\lambda'$ obtained by the re-calculation to the behavior recognizing section 145 and the behavior predicting section 146.

In step S124, the behavior recognizing section 145 acquires the time series data on the locations supplied from the location acquiring section 11, and the time series data on the times supplied from the time acquiring section 111.

In step S125, the behavior recognizing section 145 recognizes the state nodes indicating the current activity state of the user, using the user activity model by means of the re-calculated parameters $\lambda'$ supplied from the parameter re-calculating section 144, to thereby recognize the current location of the user. This process is the same as the process in the above-described step S22 (in FIG. 8).

In step S126, the behavior predicting section 146 searches paths which can be taken from the current location of the user, using the user activity model by means of the re-calculated parameters $\lambda'$ supplied from the parameter re-calculating section 144. Further, the behavior predicting section 146 calculates the selection probability of each searched path. This process is the same as the process in the above-described steps S23 to S33 (in FIG. 8).

In step S127, the arrival time predicting section 16 extracts paths including the input destination from the paths searched by the behavior predicting section 146, and then calculates the arrival probability for the destination. Further, the arrival time predicting section 16 calculates the arrival time of each path up to the destination. This process is the same as the process in steps S34 to S37 (in FIG. 8).

In step S128, the display section 18 displays the arrival probability for the destination and the path and the arrival time up to the destination, and then the procedure is terminated. This process is the same as the process in step S38 (in FIG. 8).

[Parameter Re-Calculation Process]

Next, a parameter re-calculation process in step S123 in FIG. 20 will be described with reference to a flowchart in FIG. 21.

Firstly, in step S141, the transition frequency counting section 161 counts the frequency $n_{ij}$ of each state transition, using the state series data supplied from the state series classifying section 143 as the target. That is, if the frequency (count value) of the path for moving from a state node $s_i$ to a state node $s_j$ is expressed as $n_{ij}$, the transition frequency counting section 161 calculates the frequency $n_{ij}$ (i=1 to N, j=1 to N, an N is a final node number of time series data (that is, the number of nodes)) of each state transition, using the state series data supplied from the state series classifying section 143 as a target.

In step S142, the transition parameter calculating section 162 calculates the transition parameters $A_{ij}$ corresponding to the state transition probability $a_{ij}$ of the HMM. Specifically, the transition parameter calculating section 162 calculates the transition probability $A_{ij}$ by the equation (8), on the basis of the frequency $n_{ij}$ of each state transition supplied from the transition frequency counting section 161.

In step S143, the state frequency counting section 163 counts the state frequency $cnt_i$, using the state series data supplied from the state series classifying section 143 as the target. That is, the state frequency counting section 163 counts the total number $cnt_i$ of the respective state nodes $s_i$, using the state series data supplied from the state series classifying section 143 as the target. The total number $cnt_i$ of the respective state nodes $s_i$ which is a count result is supplied to the observation parameter calculating section 165.

The process in step S143 may be performed prior to the processes of the above-described steps S141 and S142, or may be performed in parallel with the processes of steps S141 and S142.

In step S144, the time series data classifying section 164 classifies the time series data on the locations and the times from the state series classifying section 143 according to the state node. That is, the time series data classifying section 164 classifies the location data x which is sequentially supplied from the state series classifying section 143 according to the state node, for grouping. Further, the time series data classifying section 164 classifies the time data t which is sequentially supplied from the state series classifying section 143 according to the state node, for grouping.

In step S145, the observation parameter calculating section 165 calculates the observation parameters of the respective time series data on the locations and the times. The observation parameter calculating section 165 calculates the average value $\mu 1_i$ of the state nodes $s_i$ and the standard deviation $\sigma 1_i$, as the observation parameters of the time series data on the locations. Further, the observation parameter calculating section 165 calculates the average value $\mu 2_i$ of the state nodes $s_i$ and the standard deviation $\sigma 2_i$, as the observation parameters of the time series data on the times.

The observation parameter calculating section 165 supplies the calculated observation parameters of the respective time series data on the locations and the times to the behavior recognizing section 145 and the behavior predicting section 146. Then, the procedure returns to FIG. 20, and goes to step S124.

Figure 20:
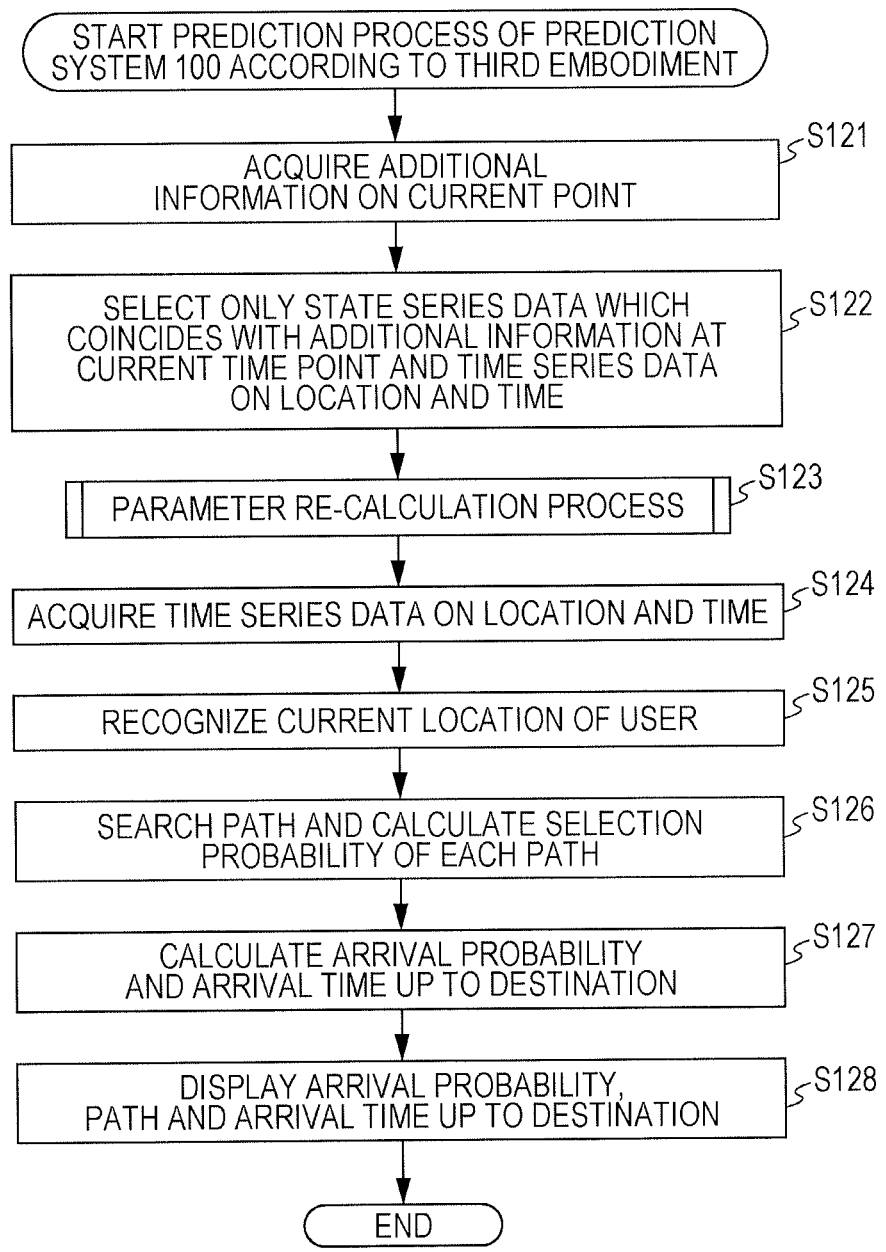
FIG. 20 is a flowchart illustrating a prediction process of a prediction system according to a third embodiment of the present invention.
Figure 21:
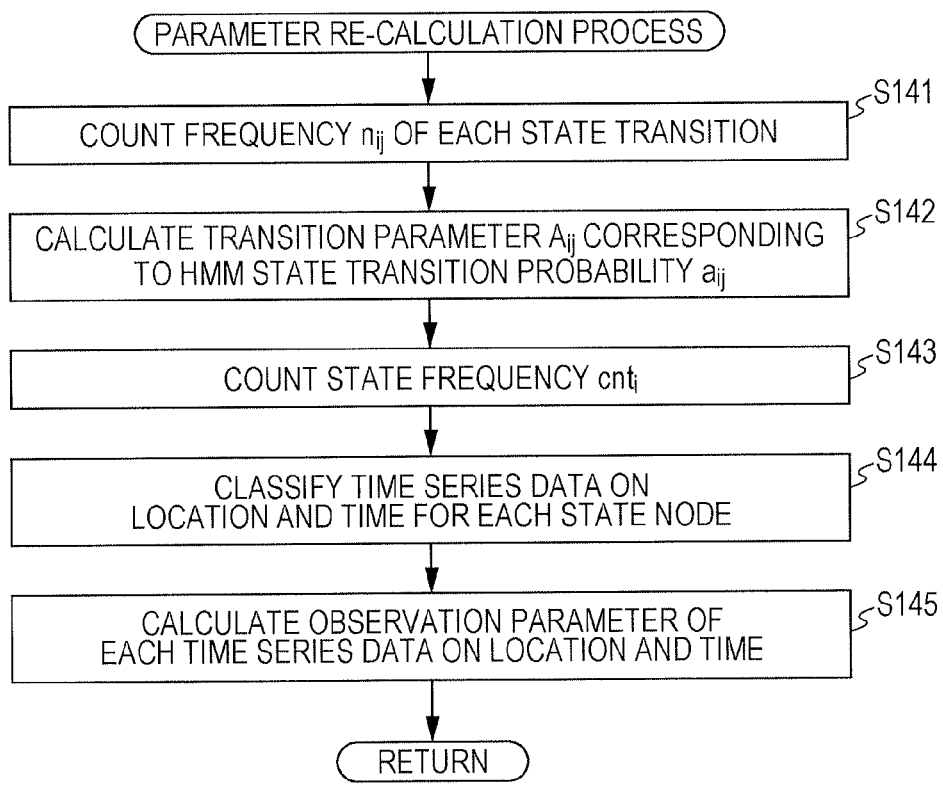
FIG. 21 is a flowchart illustrating a parameter re-calculation process in step S123 in FIG. 20.

In the prediction process in FIGS. 20 and 21, since the processes of steps S122 and S123 are the selection of the data and the calculation of the statistical process, it is possible to instantly calculate the re-calculation parameters λ'. Accordingly, it is possible to briefly and accurately perform the prediction for the paths, arrival times and the like up to the destination, while considering the additional information on the day, traffic condition, weather condition and the like as the additional conditions.

6. Fourth Embodiment of the Present Invention

The above-described first to third embodiments of the prediction system 100 correspond to the first configuration of the prediction system 1 in Japanese Patent Application No. 2009-208064. That is, the destination is designated by the user, and the prediction system 100 predicts the arrival probability for the designated destination and the paths and arrival times up to the destination.

However, the first to third embodiments of the prediction system 100 may correspond to the second configuration example of the prediction system 1 for predicting the destination in Japanese Patent Application No. 2009-208064. That is, a fourth embodiment of the prediction system 100 may be realized by combining any one of the first to third embodiments of the prediction system 100 and the second configuration example of the prediction system 1.

In the first or second embodiment of the prediction system 100, in order to predict the destination, the multi stream HMM may be performed in which the time series data on the movement speeds is acquired in addition to the time series data on the locations and the times, and also the time series data on the behavior modes (behavior mode series data) is added. Further, in the prediction process, it is possible to recognize the behavior mode from the input time series data on the movement speeds of the user, and to predict the location of the stationary state as the destination. Further, it is possible to calculate the arrival probabilities, paths and arrival times for the predicted destination, and to present them to the user.

[Block Diagram Illustrating Fourth Embodiment of the Present Invention]

Figure 22:
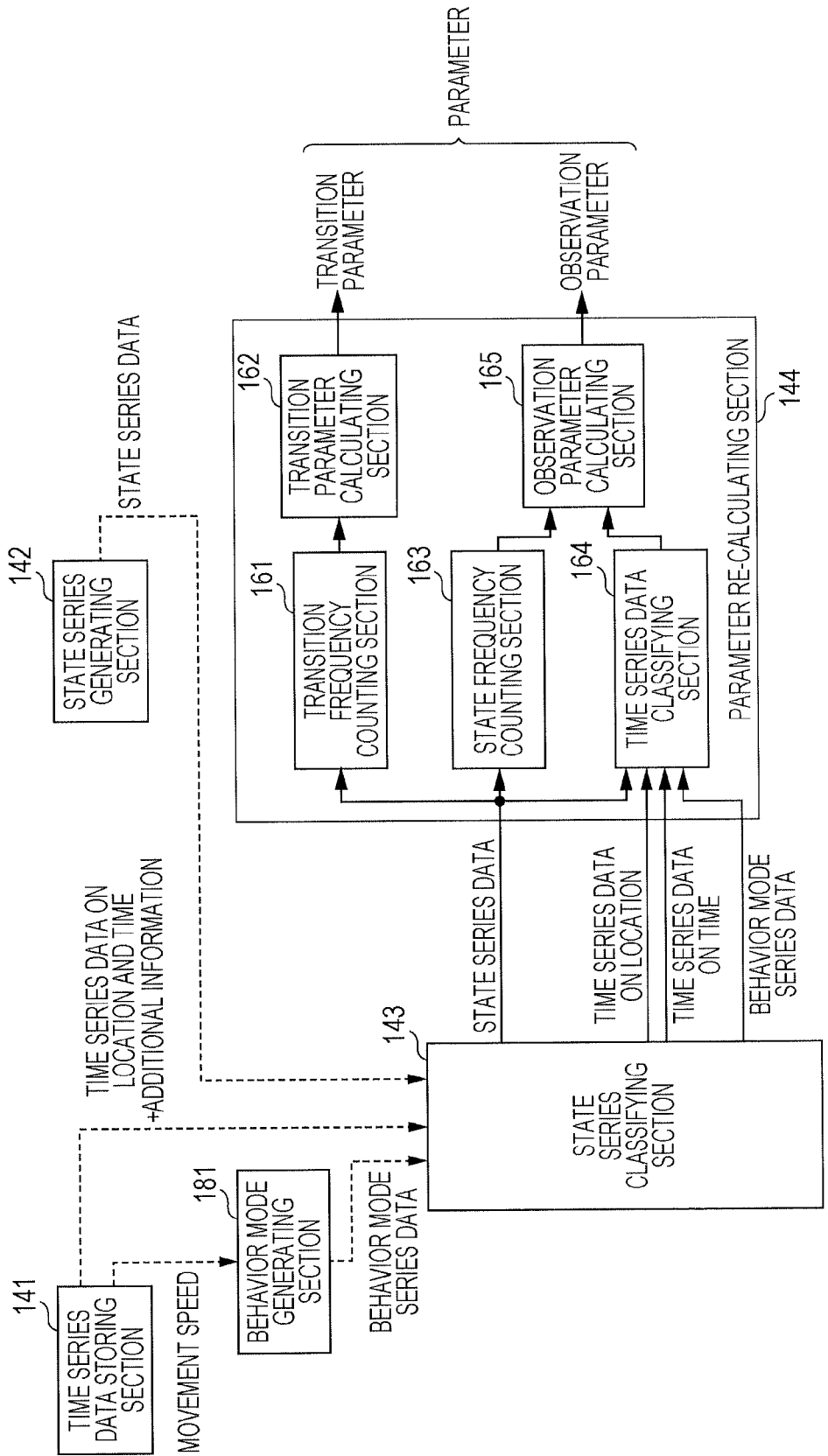
FIG. 22 is a block diagram illustrating a part of a configuration example of a prediction system 100 according to a fourth embodiment of the present invention.

FIG. 22 is a block diagram illustrating a portion relating to the parameter re-calculation process according to an embodiment in which the destination is further predicted in the third embodiment (in FIG. 17) of the prediction system 100 (hereinafter, referred to as a fourth embodiment of the prediction system 100).

In the fourth embodiment of the prediction system 100, the time series data on the movement speeds is acquired in addition to the time series data on the locations and the times, and then is stored in the time series data 141. Further, as shown in FIG. 22, a behavior mode generating section 181 for converting the time series data on the movement speeds stored in the time series data 141 into the time series data on the behavior modes (behavior mode series data) is additionally provided. The behavior mode generating section 181 can employ the same configuration as in the behavior mode generating section 72 in FIG. 11, for example.

The state series classifying section 143 correspondingly stores the time series data on the locations and the times including the additional information, the behavior mode series data and the state series data in the internal storing section.

Further, in the prediction process, the state series classifying section 143 selects the behavior mode series data and the state series data which satisfies the additional condition supplied in real time, and the time series data on the locations and the times, and then supplies them to the parameter re-calculating section 144. The state series data is supplied to the transition frequency counting section 161, the state frequency counting section 163 and the time series data classifying section 164, of the parameter re-calculating section 144. The time series data on the locations and the times and the behavior mode series data are supplied to the time series data classifying section 164.

The observation parameters of the time series data on the locations and the times in the parameter re-calculating section 144 are calculated by the above-described equations (11) to (14).

On the other hand, the observation parameters of the time series data on the behavior modes are calculated as follows.

The time series data classifying section 164 classifies the behavior modes m sequentially supplied from the state series classifying section 143 according to the state node, for grouping. Set data $M_i$ of the behavior modes m in the state nodes $s_i$ can be expressed as the following equation (15).

$$M_i = \{m_{i,1}, m_{i,2}, \ldots, m_{i,cnt_i}\} \quad (15)$$

The number of elements of the set data $M_i$ in the equation (15) is $cnt_i$.

The observation parameter calculating section 165 calculates an appearance frequency $P(s_i|m)$ of each behavior mode m expressed as the following equation (16), for the set data $M_i$ of the behavior modes in the state nodes $s_i$, as the observation parameters of the time series data on the behavior modes.

$$P(s_i \mid m) = \frac{1}{cnt_i} N(M_i = m) \quad (16)$$

In the equation (16), $N(M_i=m)$ represents the number of the behavior modes m in the set data M. Here, the average value and the standard deviation are not calculated but the probability is calculated, unlike the above-described equations (11) to (14). This is because the behavior modes are not continuous quantities but discrete values.

The observation parameter calculating section 165 outputs the appearance frequency $P(s_i|m)$ as the observation parameters, in addition to the average value $\mu 1_i$ and the standard deviation $\sigma 1_i$, and the average value $\sigma 2_i$ and the standard deviation $\sigma 2_i$ of each state, which are time series data on the locations and the times and the observation probability of the behavior modes.

In the prediction process according to the fourth embodiment of the prediction system 100, the destination predicting section 55 (in FIG. 10) predicts the destinations and calculates the arrival probability for each destination, using the parameters $\lambda'$ re-calculated as described above.

7. Description about Verification Experimental Result of Embodiments of the Present Invention

[Verification of First Embodiment of the Prediction System 100]

Effects of the prediction system 100 according to the embodiments of the present invention will be described with reference to FIGS. 23 to 33. Experiments shown in FIGS. 23 to 33 have been performed for the embodiment in which the time series data on the movement speeds are additionally given to the learning model (multi stream HMM) as the input streams and the destination is further predicted.

Figure 23:
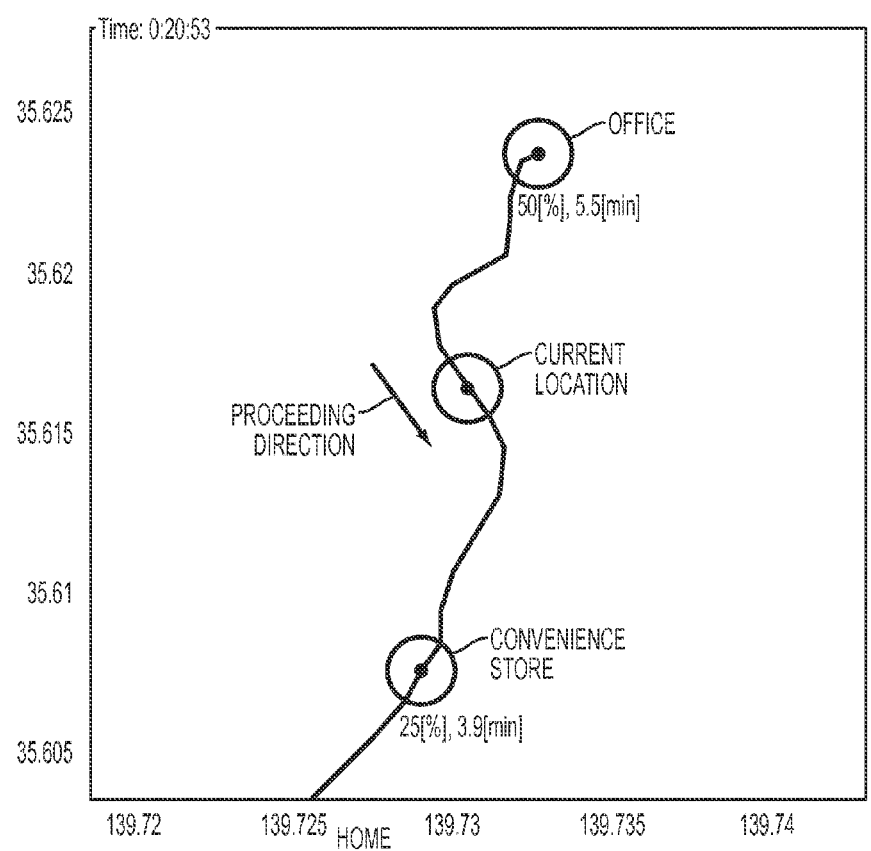
FIG. 23 is a diagram illustrating an experimental result in which an effect of a prediction system to which the present invention is applied is verified.
Figure 24:
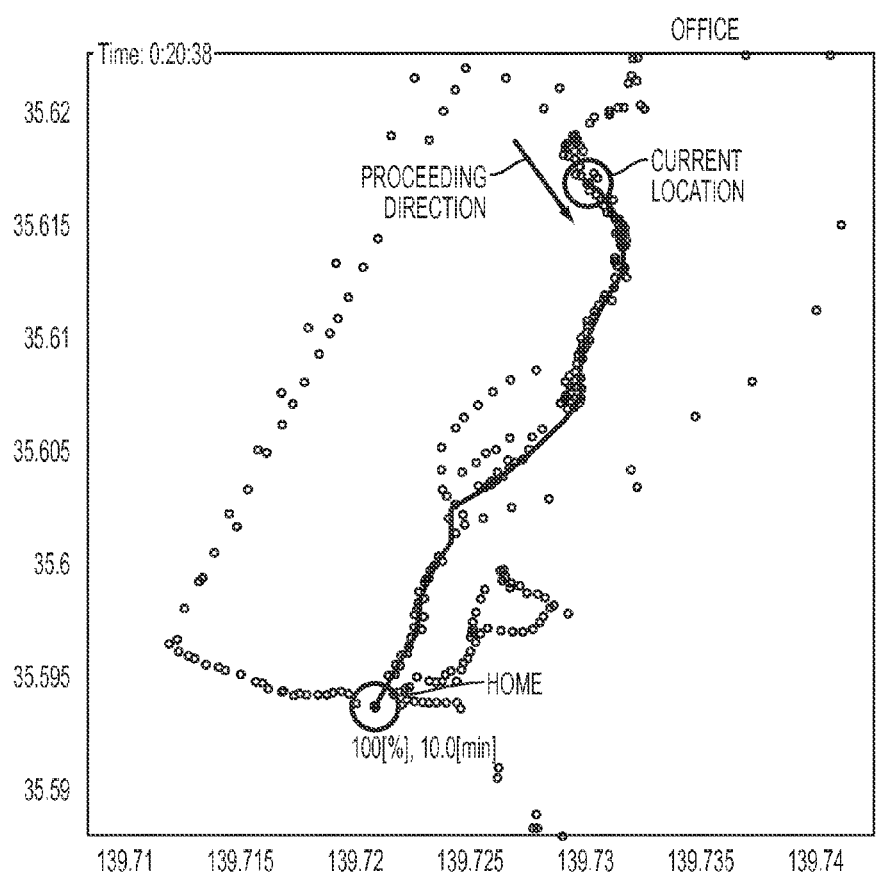
FIG. 24 is a diagram illustrating an experimental result in which an effect of a prediction system to which the present invention is applied is verified.

Firstly, referring to FIGS. 23 and 24, the second configuration (in FIG. 10) of the prediction system in Japanese Patent Application No. 2009-208064 is compared with an embodiment in which the destination is further predicted additionally using the time series data on the movement speeds as the input stream in the first embodiment (in FIG. 22) of the prediction system 100.

FIG. 23 illustrates a prediction result according to the second configuration of the prediction system in Japanese Patent Application No. 2009-208064 shown in FIG. 10. That is, FIG. 23 illustrates a result that the prediction system 1 in FIG. 10 predicts the destination from the current location of the user, paths, arrival probabilities, and arrival times up to the destination.

On the other hand, FIG. 24 illustrates a prediction result according to the embodiment in which the destination is further predicted additionally using the time series data on the movement speeds as the input stream in the first embodiment (in FIG. 15) of the prediction system 100.

In FIGS. 23 and 24, it can be found that as an actual behavior of the user (real value corresponding to the prediction result), the user is on their way to the residence located before a convenience store along a proceeding direction indicated by an arrow, from the current location.

As shown in FIG. 23, the prediction system 1 outputs that the user returns to the office after 5.5 minutes with a probability of 50%, or stops by the convenience store after 3.9 minutes with a probability of 50%, as the prediction result.

Thus, since a state node corresponding to the current value or any one of state nodes which will be passed in the future predicted from the current location shares both paths of the going and returning, the prediction system 1 predicts a backward path from the state node of the current location to thereby predict the returning to the office.

In this respect, the prediction system 100 shown in FIG. 24 predicts that the user reaches the residence after 10 minutes with a probability of 100% from the current location. In the prediction system 100, using the fact that times are different between the going and the returning, different state nodes are allocated to the same location between the going and returning. Thus, in consideration of the time that the prediction is performed is 0:20, a state node which is not only close in its latitude and longitude but also close to midnight is selected as the state node corresponding to the current location. As a result, the prediction result is improved so that the prediction of the only returning path is performed.

[Verification of Third Embodiment of Prediction System 100]

Next, an embodiment in which the destination is further predicted additionally using the time series data on the movement speeds as the input stream, in the first embodiment (in FIG. 15) of the prediction system 100, is compared with the fourth embodiment (in FIG. 22) of the prediction system 100, with reference to FIGS. 25 to 33.

Figure 25:
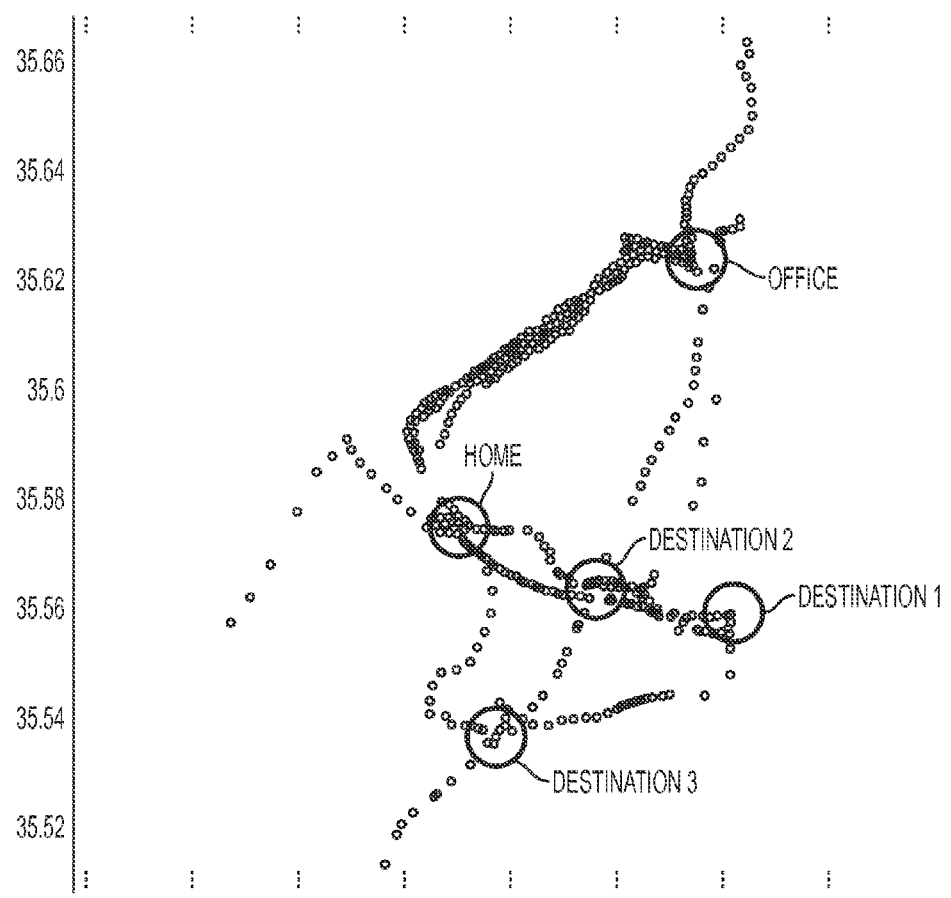
FIG. 25 is a diagram illustrating an experimental result in which an effect of a prediction system to which the present invention is applied is verified.

FIG. 25 illustrates a user behavior model after the learning process shown on a map, in the embodiment in which the destination is further predicted in the first embodiment (in FIG. 15) of the prediction system 100. This learning data includes behaviors of the user on weekdays and holidays, but in the first embodiment, the learning can not be performed in which weekdays and holidays are distinguished from each other.

With reference to the user behavior model after the learning process in FIG. 25, a destination 1, a destination 2, a destination 3 and the like, in addition to the residence and office, are detected as main destinations of the user.

Figure 26:
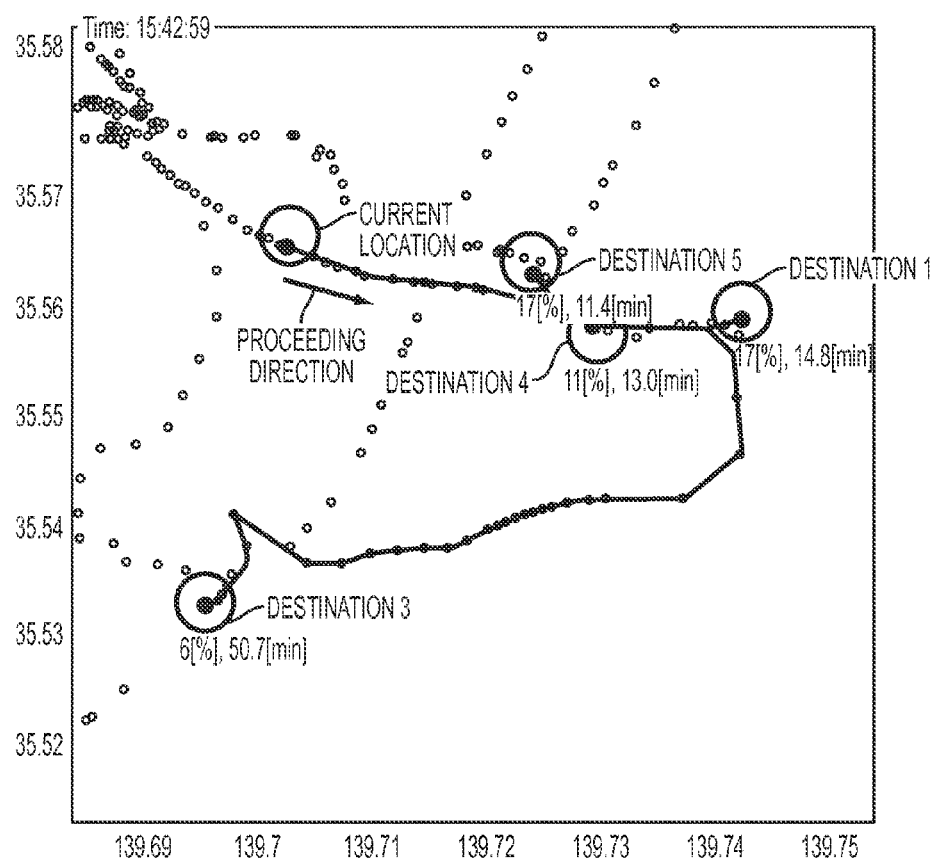
FIG. 26 is a diagram illustrating an experimental result in which an effect of a prediction system to which the present invention is applied is verified.

FIG. 26 illustrates a prediction result in which a behavior of the user on a specific "weekday" is predicted using the user behavior model in FIG. 25.

In FIG. 26, it can be found that the user proceeds along the arrow proceeding direction toward the destination 1 from the current location, as the actual behavior of the user (real value corresponding to the prediction result).

The prediction result obtained by performing the prediction process in the first embodiment of the prediction system 100, in which the destination is further predicted, is as follows.

(1) arrival after 14.8 minutes, with an arrival probability of 17% at the destination 1

(2) arrival after 50.7 minutes, with an arrival probability of 6% at the destination 3

(3) arrival after 13 minutes, with an arrival probability of 11% at the destination 4

(4) arrival after 11.4 minutes, with an arrival probability of 17% at the destination 5

There is no prediction that the traveled way is reversed in a backward direction, unlike the prediction result in FIG. 23, but since the arrival probability of the destination 1 which is a real value is low, it is not a desirable prediction result.

Figure 27:
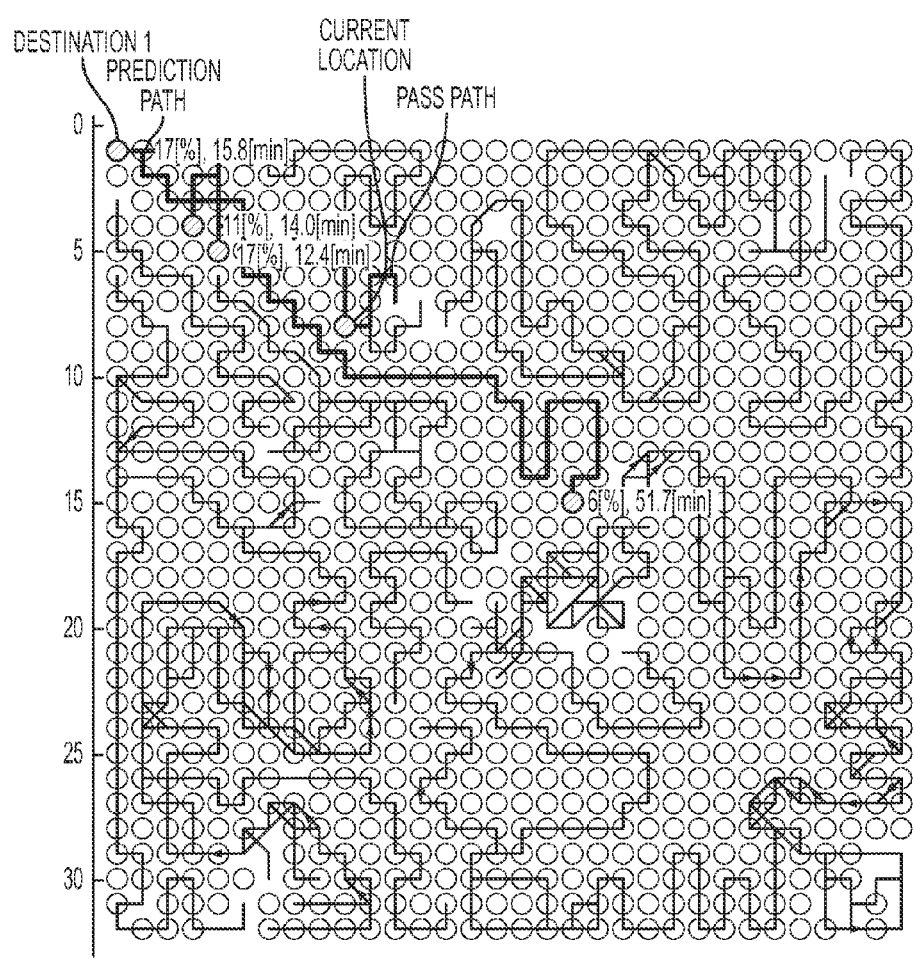
FIG. 27 is a diagram illustrating an experimental result in which an effect of a prediction system to which the present invention is applied is verified.

FIG. 27 is a diagram illustrating a state where the prediction result in FIG. 26 is re-written so that the state transition can be easily viewed.

A heavy black line in FIG. 27 represents state nodes (pass paths) which are passed up to the current location node. Further, a heavy gray line represents a prediction path, and a circle close to the prediction path represents a state node of the destination. A thin black line represents connections between the state nodes.

Referring to FIG. 27, it can be found that the prediction paths meander on the left side with reference to the current location, which causes the plurality of destinations and prediction paths to be displayed.

Figure 28:
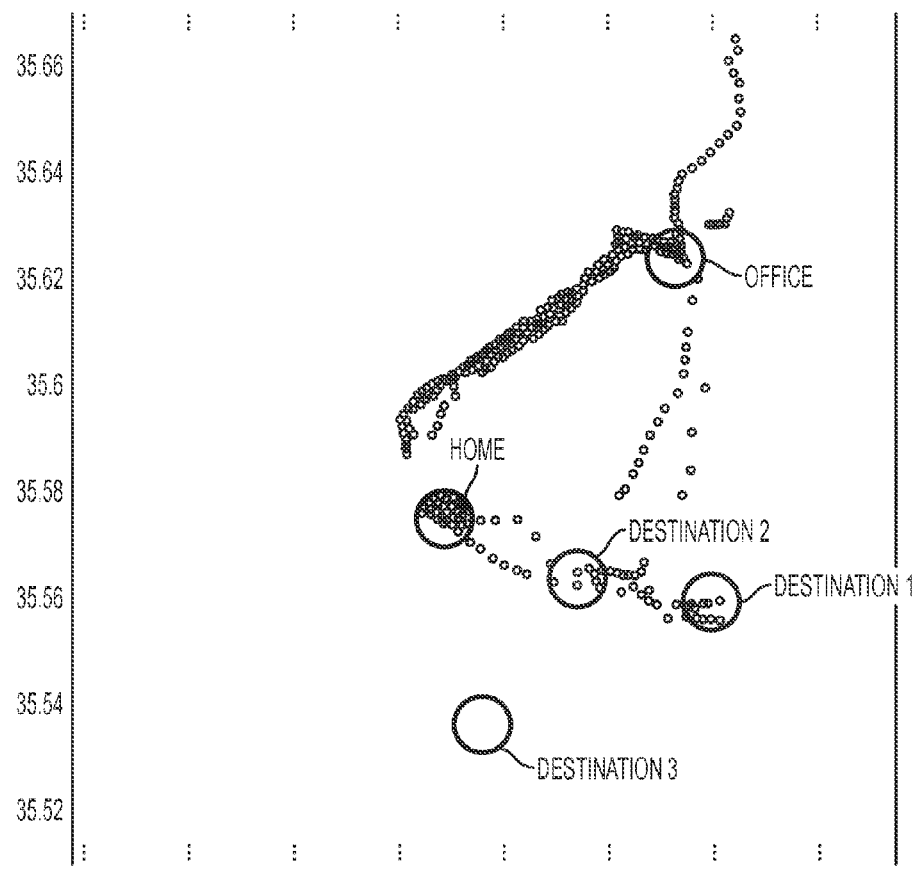
FIG. 28 is a diagram illustrating an experimental result in which an effect of a prediction system to which the present invention is applied is verified.

FIG. 28 is a diagram illustrating a state where the user behavior model, after the learning process when the parameters are re-calculated for the state series data on the "weekdays", is shown on the map, in the fourth embodiment (in FIG. 22) of the prediction system 100.

In FIG. 28, only the paths for commuting between the residence and the office are shown. In this user's case, the paths are learned along which the user mainly commutes between the residence and the office on weekdays. Further, in the user behavior model, there are shown the paths along which the user stops by the destination 1 or the like in the afternoon on weekdays. Actually, the user may go to the destination 1, without going to the office due to a holiday or the like, even on weekdays.

In this respect, in FIG. 28, the path along which the user goes to the destination 3 or the like does not exist. The user generally passes the destination 2 on weekdays, and thus, the destination 2 is not recognized as the destination in FIG. 28.

Figure 29:
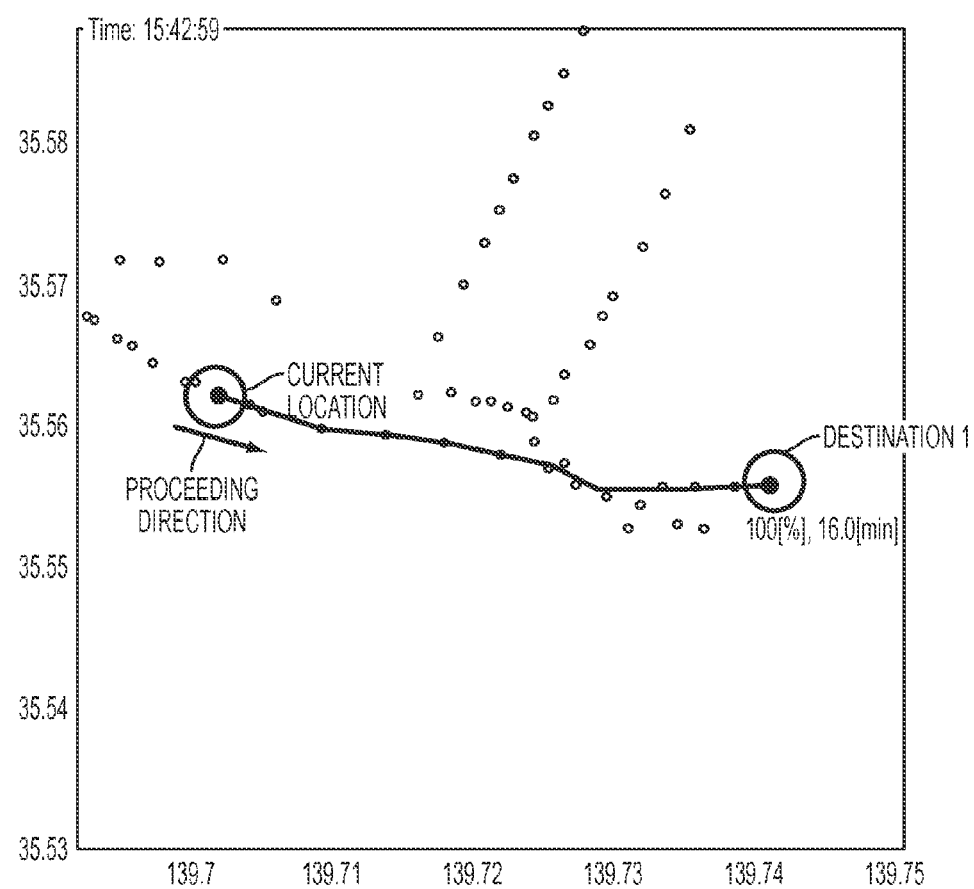
FIG. 29 is a diagram illustrating an experimental result in which an effect of a prediction system to which the present invention is applied is verified.

FIG. 29 illustrates the prediction result obtained by predicting the behaviors of the user during the weekdays, in the fourth embodiment (in FIG. 22) of the prediction system 100. In other words, FIG. 29 shows the prediction result predicted in the fourth embodiment (in FIG. 22) of the prediction system 100 from the same location as the current location in FIG. 26.

Referring to FIG. 29, the predicted destination candidates are limited to only the destination 1. In this way, by performing the classification according to the condition of weekdays, the predicted destination candidates can be limited to one destination. In a case where the user moves from the current location in the conditions of weekdays, the user can only experience going to the destination 1 and then returning therefrom.

Figure 30:
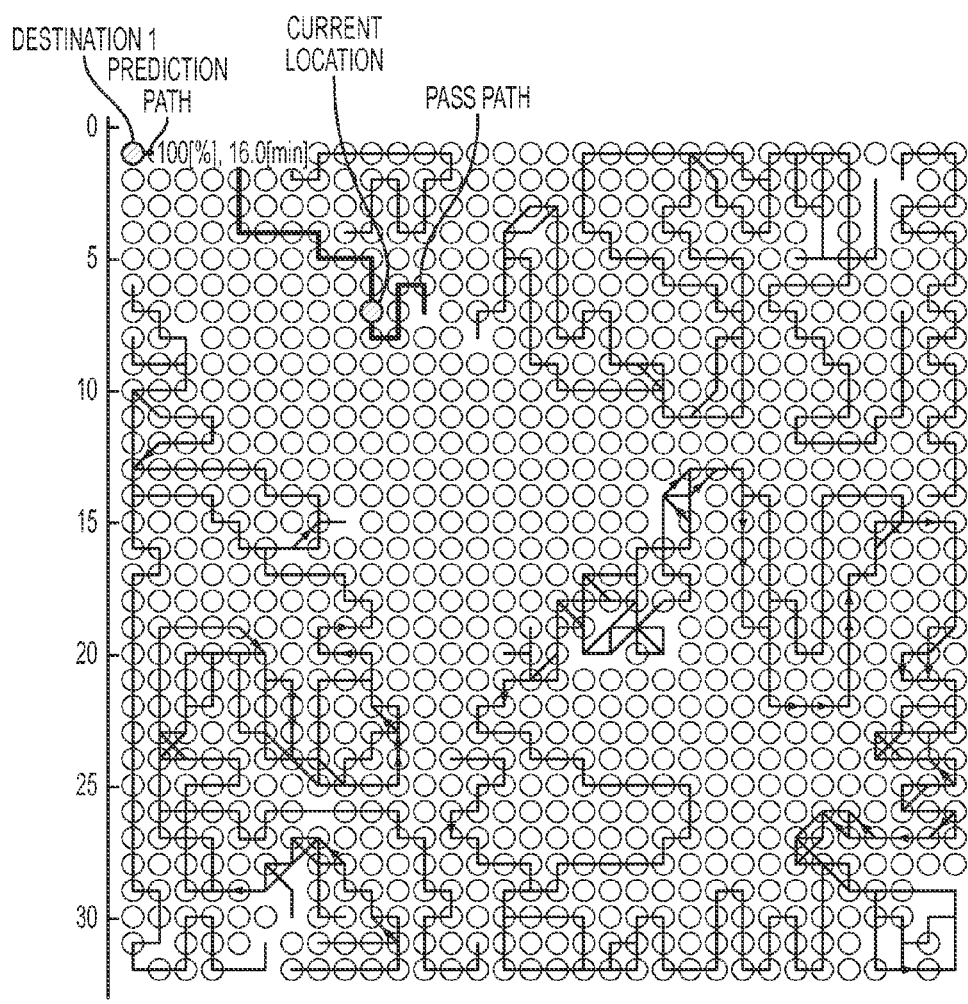
FIG. 30 is a diagram illustrating an experimental result in which an effect of a prediction system to which the present invention is applied is verified.

FIG. 30 is a diagram illustrating a state where the prediction result in FIG. 29 is re-written so that the state transition can be easily viewed.

Referring to FIG. 30 in comparison with FIG. 27, it can be found that the used state nodes are decreased. In particular, it can be found that the portions meandering in FIG. 27 are simplified over the destination 1 from the current location. In this way, as the parameters are re-calculated by the additional information, it is possible to reduce the candidates, and to accurately perform the prediction.

Figure 31:
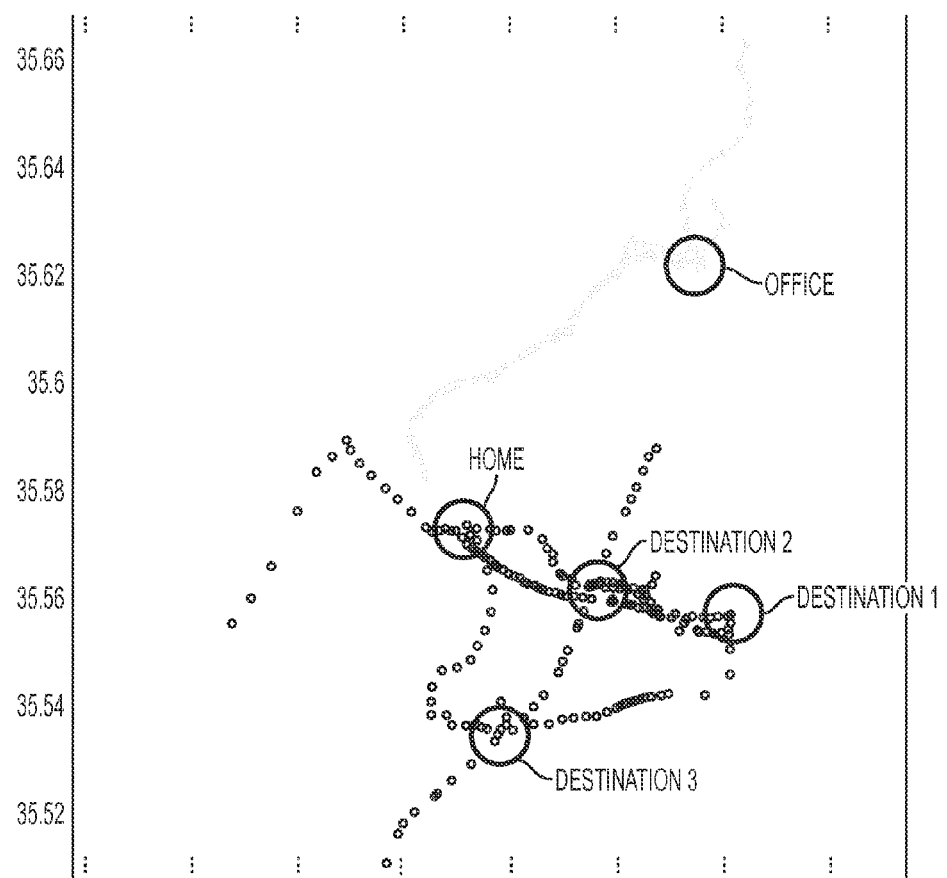
FIG. 31 is a diagram illustrating an experimental result in which an effect of a prediction system to which the present invention is applied is verified.

FIG. 31 is a diagram illustrating a state where the user behavior model, after the learning process when the parameters are re-calculated for the state series data on "holidays", is shown on the map, in the fourth embodiment (in FIG. 22) of the prediction system 100.

In FIG. 31, in the learning data of the user, a user behavior model is generated in which the user does not go to the office on holidays, and as a result, there is no path for the office.

Figure 32:
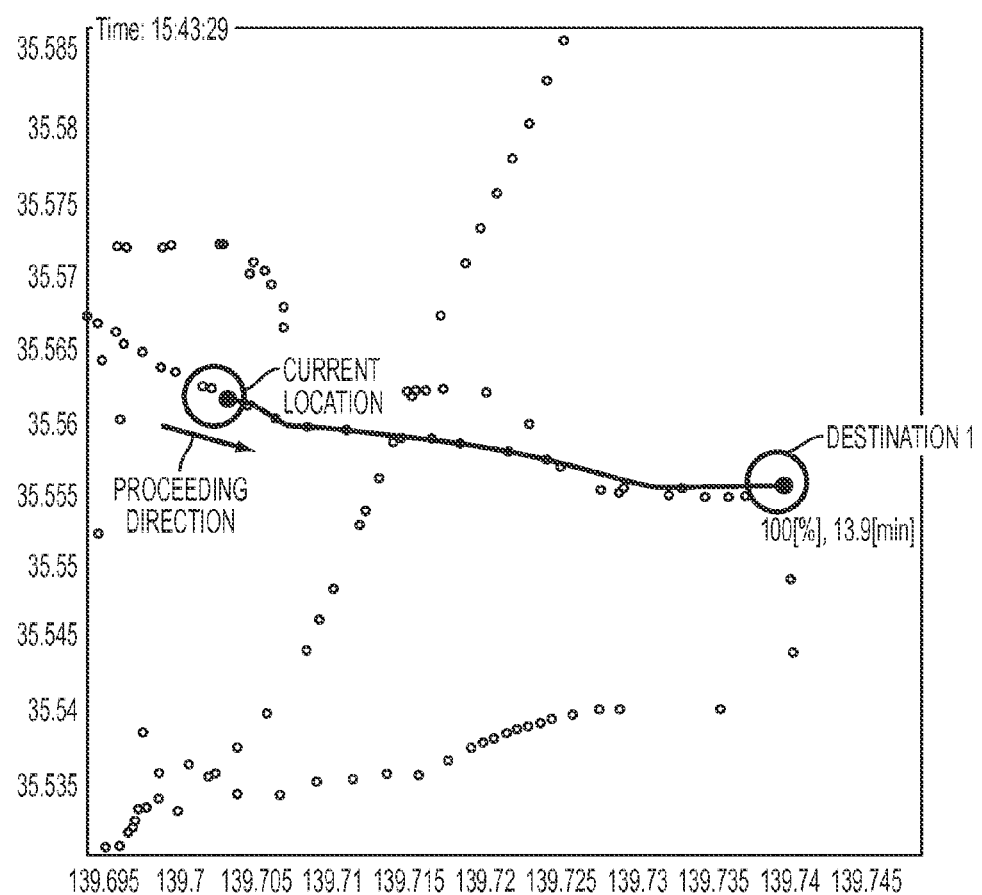
FIG. 32 is a diagram illustrating an experimental result in which an effect of a prediction system to which the present invention is applied is verified.

FIG. 32 illustrates a prediction result that the behavior of the user during "holidays" is predicted, in the fourth embodiment (in FIG. 22) of the prediction system 100. That is to say, FIG. 32 shows the prediction result obtained by performing the prediction in the fourth embodiment (in FIG. 22) of the prediction system 100 from the same location as the current location in FIG. 26.

Referring to FIG. 32, the predicted destination candidates are limited to only the destination 1, in a similar way to the case in FIG. 29.

Figure 33:
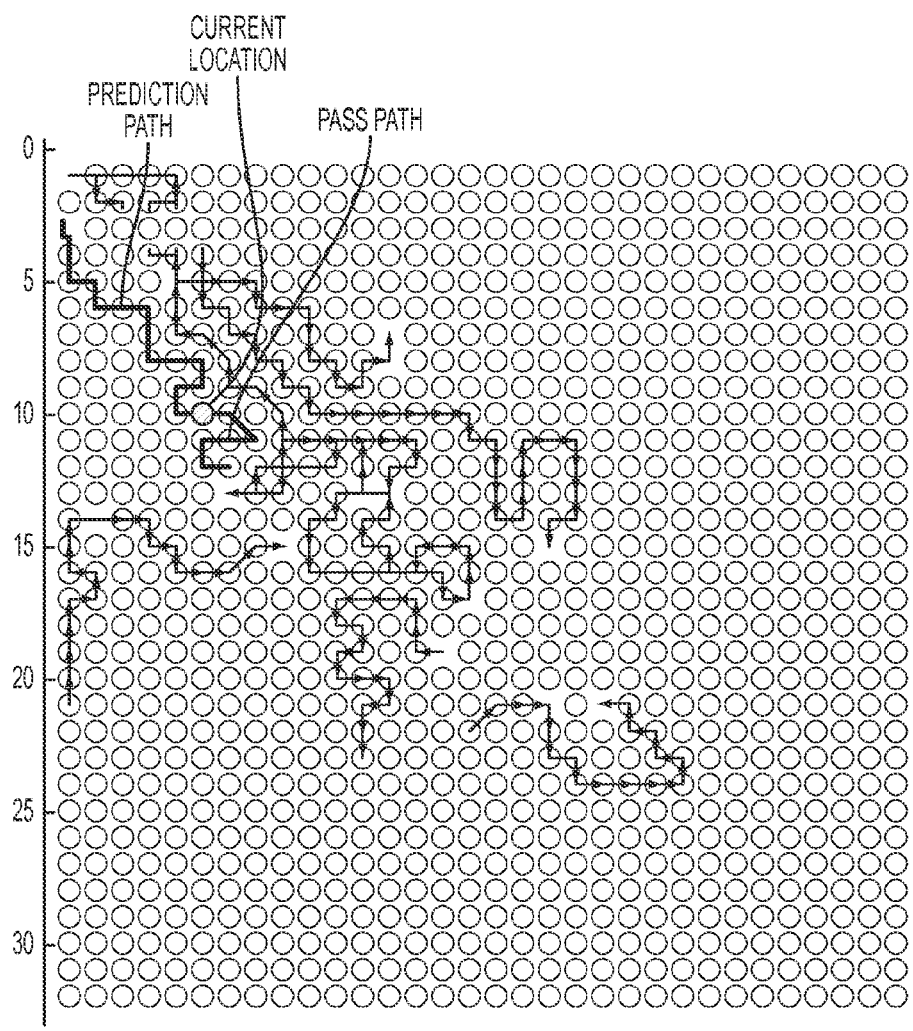
FIG. 33 is a diagram illustrating an experimental result in which an effect of a prediction system to which the present invention is applied is verified.

FIG. 33 is a diagram illustrating a state where the prediction result in FIG. 32 is re-written so that the state transition can be easily viewed.

Referring to only FIGS. 29 and 32, the prediction results seem to be the same. However, referring to FIG. 33 in comparison with FIG. 30, it can be found that different paths are predicted on "weekdays" and "holidays". That is, it can be found that different state series can be predicted on "weekdays" and "holidays", respectively.

As described above, according to the prediction system 100 according to the embodiments of the present invention, it is possible to more accurately predict a future path and an elapsed time after the current time, and to learn the learning parameters therefor.

The series of processes as described above may be performed by hardware or software. In a case where the series of processes is performed by software, a program for forming the software is installed in a computer. Here, the computer includes a computer mounted in an exclusive hardware or a general-purpose personal computer which is installed with a variety of programs to perform a variety of functions.

FIG. 34 is a block diagram illustrating a hardware configuration example of the computer which executes the series of processes as described above by programs.

In the computer, a CPU (central processing unit) 201, a ROM (read only memory) 202 and a RAM (random access memory) 203 are connected to each other through a bus 204.

Further, an input and output interface 205 is connected to the bus 204. An input section 206, an output section 207, a storing section 208, a communication section 209, a drive 210 and a GPS sensor 211 are connected to the input and output interface 205.

The input section 206 includes a keyboard, a mouse, and a microphone. The output section 207 includes a display and a speaker. The storing section 208 includes a hard disc and a non-volatile memory. The communication section 209 includes a network interface. The drive 210 drives a removable recording medium 212 such as a magnetic disc, an optical disc, a magneto-optical disc, or a semiconductor memory. The GPS sensor 211 corresponds to the above-described location acquiring section 11 and the time acquiring section 111.

In the computer with such a configuration, for example, the CPU 201 loads a program stored in the storing section 208 to the RAM 203 through the input and output interface 205 and the bus 204 to be executed, to thereby perform the series of processes as described above.

The program executed by the computer (CPU 201) can be recorded in the removable recording medium 212 which is a package media or the like for supply, for example. Further, the program can be supplied through a wired or wireless transmission medium, such as a local area network, the internet or digital satellite broadcasting.

In the computer, the program can be installed in the storing section 208 through the input and output interface 205, by installing the removable recording medium 212 to the drive 210. Further, the program may be received in the communication section 209, through the wired or wireless transmission medium, and then may be installed in the storing section 208. In addition, the program may be installed in the ROM 202 or the storing section 208, in advance.

The program executed by the computer may be a program in which the procedure is performed in a time series manner in the order as described in this description, or may be a program in which the procedure is performed in parallel or at a necessary timing, for example, when a call is performed.

In this description, the steps disclosed in the flowcharts may be performed in a time series manner in the described order, or may be performed in parallel or at a necessary timing, for example, when the call is performed.

In this description, the system refers to the entire apparatus including a plurality of devices.

The embodiments of the present invention is not limited to the above-described embodiments, but may be variously modified without departing from the spirit of the invention.

The present application contains subject matter related to that disclosed in Japanese Priority Patent Application JP 2009-277000 filed in the Japan Patent Office on Dec. 4, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A learning apparatus comprising:
   location acquiring means for acquiring time series data on locations of a user;
   time acquiring means for acquiring time series data on times;
   learning means for learning an activity model indicating an activity state of the user as a probabilistic state transition model, using the respective acquired time series data on the locations and the times as an input;
   additional information acquiring means for acquiring time series data on additional information of one or more types other than the locations of the user and the times;
   state series generating means for generating time series data on state nodes from the time series data on the locations and the times by inputting the acquired time series data on the locations and the times in the activity model of the user learned by the learning means and outputting the time series data on the state nodes of the activity model of the user;
   selecting means for correspondingly storing the time series data on the additional information acquired by the additional information acquiring means and the time series data on the state nodes generated by the state series generating means, and for selecting only the time series data on the state nodes corresponding to the additional information at a current time point acquired by the additional information acquiring means from among the stored time series data in a case where the activity model of the user at the current time point is predicted using the activity model of the user learned by the learning means; and
   re-calculating means for re-calculating a parameter for the activity model of the user by a statistical process, using the time series data on the state nodes selected by the selecting means.

2. The learning apparatus according to claim 1, further comprising day acquiring means for acquiring time series data on days,
   wherein the learning means learns the activity model indicating the activity state of the user, additionally using the time series data on the days as the input.

3. The learning apparatus according to claim 2, further comprising at least one of traffic condition acquiring means for acquiring time series data on traffic conditions and weather condition acquiring means for acquiring time series data on weather conditions,
   wherein the learning means learns the activity model indicating the activity state of the user, additionally using the time series data on at least one of the traffic conditions and the weather conditions as the input.

4. A learning method performed by a learning apparatus which recognizes an activity model indicating an activity state of a user and learns the activity model of the user for use in a prediction apparatus which predicts a behavior of the user as a probabilistic state transition model, the method comprising the steps of:
   acquiring time series data on locations of the user;
   acquiring time series data on times;
   learning the activity model of the user as the probabilistic state transition model, using the respective acquired time series data on the locations and the times as an input;
   acquiring time series data on additional information of one or more types other than the locations of the user and the times;
   generating time series data on state nodes from the time series data on the locations and the times by inputting the acquired time series data on the locations and the times in the learned activity model of the user and outputting the time series data on the state nodes of the activity model of the user;
   correspondingly storing the acquired time series data on the additional information and the generated time series data on the state nodes, and selecting only the time series data on the state nodes corresponding to the acquired additional information at a current time point from among the stored time series data in a case where the activity model of the user at the current time point is predicted using the learned activity model of the user; and
   re-calculating a parameter for the activity model of the user by a statistical process, using the selected time series data on the state nodes.

5. A program which functions as the following means in a computer, the means comprising:
   location acquiring means for acquiring time series data on locations of a user;
   time acquiring means for acquiring time series data on times;
   learning means for learning an activity model indicating an activity state of the user as a probabilistic state transition model, using the respective acquired time series data on the locations and the times as an input;

additional information acquiring means for acquiring time series data on additional information of one or more types other than the locations of the user and the times;

state series generating means for generating time series data on state nodes from the time series data on the locations and the times by inputting the acquired time series data on the locations and the times in the activity model of the user learned by the learning means and outputting the time series data on the state nodes of the activity model of the user;

selecting means for correspondingly storing the time series data on the additional information acquired by the additional information acquiring means and the time series data on the state nodes generated by the state series generating means, and for selecting only the time series data on the state nodes corresponding to the additional information at a current time point acquired by the additional information acquiring means from among the stored time series data in a case where the activity model of the user at the current time point is predicted using the activity model of the user learned by the learning means; and re-calculating means for re-calculating a parameter for the activity model of the user by a statistical process, using the time series data on the state nodes selected by the selecting means.

6. A prediction apparatus comprising:

location acquiring means for acquiring time series data on locations of a user;

time acquiring means for acquiring time series data on times;

behavior recognizing means for recognizing a current location of the user using an activity model of the user, wherein the activity model indicates an activity state of the user and is obtained by being learned as a probabilistic state transition model, using the respective acquired time series data on the locations and the times as an input, by a learning apparatus;

behavior predicting means for predicting a possible path and a selection probability of the path from the current location of the user recognized by the behavior recognizing means; and arrival time predicting means for predicting an arrival time and an arrival probability for arrival at a destination from the predicted path and selection probability.

7. The prediction apparatus according to claim 6, further comprising day acquiring means for acquiring time series data on days, wherein the learning apparatus learns the activity model of the user, additionally using the time series data on the days as the input, and wherein the behavior recognizing means and the behavior predicting means use the activity model of the user obtained by performing the learning additionally using the time series data on the days as the input.

8. The prediction apparatus according to claim 6, further comprising:

additional information acquiring means for acquiring time series data on additional information of one or more types other than the locations of the user and the times;

selecting means for correspondingly storing time series data on state nodes generated by state series generating means of the learning apparatus from the time series data on the locations and the times by inputting the time series data on the locations and the times which is learning data in the activity model of the user which is learned and by outputting the time series data on the state nodes of the activity model of the user, and the time series data on the additional information at the time when the time series data on the locations and the times which is the learning data is acquired, and for selecting only the time series data on the state nodes corresponding to the additional information at a current time point acquired by the additional information acquiring means from among the stored time series data; and re-calculating means for re-calculating a parameter for the activity model of the user by a statistical process, using the time series data on the state nodes selected by the selecting means.

9. The prediction apparatus according to claim 8, wherein the learning apparatus learns the activity model of the user using time series data on movement speeds in addition to the locations of the user, wherein the behavior recognizing means further recognizes a behavior state of the user at least including a movement state and a stationary state, using the activity model of the user obtained through the learning which additionally uses the time series data on the movement speeds of the user as the input, and wherein the arrival time prediction means further predicts state nodes in which the movement state of the user becomes the stationary state as the destination.

10. A prediction method performed by a prediction apparatus which performs prediction using an activity model of a user in which a learning apparatus learns the activity model indicating an activity state of the user as a probabilistic state transition model, the method comprising the steps of:

acquiring time series data on locations of the user;

acquiring time series data on times; and recognizing a current location of the user using the activity model of the user learned by the learning apparatus, using the respective acquired time series data on the locations and the times as an input;

predicting a possible path and a selection probability of the path from the recognized current location of the user;

predicting an arrival time and an arrival probability for arrival at a destination from the predicted path and selection probability; and displaying, on a display screen, information on the predicted arrival time and information on the predicted arrival probability.

11. A non-transitory computer-readable medium having embodied thereon a program, which when executed by a computer, causes the computer to perform a method, the method comprising:

acquiring time series data on locations of a user;

acquiring time series data on times;

recognizing a current location of the user using an activity model of the user, wherein the activity model indicates an activity state of the user and is obtained by being learned as a probabilistic state transition model, using the respective acquired time series data on the locations and the times as an input;

predicting a possible path and a selection probability of the path from the recognized current location of the user; and predicting an arrival time and an arrival probability for arrival at a destination from the predicted path and selection probability.

12. A learning apparatus comprising:

a location acquiring section which acquires time series data on locations of a user;

a time acquiring section which acquires time series data on times;

a learning section which learns an activity model indicating an activity state of the user as a probabilistic state transition model, using the respective acquired time series data on the locations and the times as an input;

an additional information acquiring section which acquires time series data on additional information of one or more types other than the locations of the user and the times;

a state series generating section which generates time series data on state nodes from the time series data on the locations and the times by inputting the acquired time series data on the locations and the times in the activity model of the user learned by the learning means and outputs the time series data on the state nodes of the activity model of the user;

a selecting section which correspondingly stores the time series data on the additional information acquired by the additional information acquiring section and the time series data on the state nodes generated by the state series generating section, and selects only the time series data on the state nodes corresponding to the additional information at a current time point acquired by the additional information acquiring section from among the stored time series data in a case where the activity model of the user at the current time point is predicted using the activity model of the user learned by the learning section; and a re-calculating section which re-calculates a parameter for the activity model of the user by a statistical process, using the time series data on the state nodes selected by the selecting section.

* * * * *